(12) United States Patent
He et al.

(10) Patent No.: US 11,343,361 B2
(45) Date of Patent: May 24, 2022

(54) MOBILE TERMINAL, CONTROL SYSTEM, AND CONTROL METHOD

(71) Applicant: XI'AN ZHONGXING NEW SOFTWARE CO., LTD., Xi'an (CN)

(72) Inventors: Haibo He, Xi'an (CN); Jie Pan, Xi'an (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 17 days.

(21) Appl. No.: 16/968,567

(22) PCT Filed: Nov. 13, 2018

(86) PCT No.: PCT/CN2018/115196
§ 371 (c)(1),
(2) Date: Aug. 8, 2020

(87) PCT Pub. No.: WO2019/153818
PCT Pub. Date: Aug. 15, 2019

(65) Prior Publication Data
US 2021/0044683 A1    Feb. 11, 2021

(30) Foreign Application Priority Data

Feb. 9, 2018  (CN) .......................... 201810135896.2

(51) Int. Cl.
*H04M 1/00* (2006.01)
*H04M 1/02* (2006.01)

(52) U.S. Cl.
CPC ....... *H04M 1/0237* (2013.01); *H04M 1/0268* (2013.01)

(58) Field of Classification Search
CPC ............. H04M 1/0268; H04M 1/0235; H04M 1/0247; H04M 2250/16; H04M 1/0237; H04M 1/0266
See application file for complete search history.

(56) References Cited

U.S. PATENT DOCUMENTS 9,258,396 B2   2/2016  Hwang
10,061,358 B2  8/2018  Lee et al.
(Continued)

FOREIGN PATENT DOCUMENTS

CN    103929530 A    7/2014
CN    106603756 A    4/2017
(Continued)

OTHER PUBLICATIONS

English Translation of the International Search Report and Written Opinion for PCT Application No. PCT/CN2018/115196, dated Jan. 30, 2019, 10 pages.

(Continued)

*Primary Examiner* — Nhan T Le
(74) *Attorney, Agent, or Firm* — Eversheds Sutherland (US) LLP

(57) ABSTRACT

A mobile terminal, a control system and a control method, the mobile terminal includes a housing and a flexible screen, the flexible screen includes a fixed portion fixed on the housing and an expansion portion movable relative to the housing; the mobile terminal further includes a support structure and a movement mechanism, the movement mechanism is configured to drive the expansion portion to move so that at least a part of the expansion portion is driven to move outside the housing; and the movement mechanism is capable of driving the expansion portion to move in an opposite direction so that the expansion portion outside the housing is driven to retract into the housing; and the support structure is configured to support the expansion portion.

21 Claims, 14 Drawing Sheets

(56) References Cited

U.S. PATENT DOCUMENTS

| | | | | |
|---|---|---|---|---|
| 2012/0280924 A1* | 11/2012 | Kummer | ............... | G06F 1/1647 345/173 |
| 2013/0058063 A1* | 3/2013 | O'Brien | ............... | G06F 1/1652 361/807 |
| 2017/0075388 A1 | 3/2017 | Yee et al. | | |
| 2020/0253063 A1 | 8/2020 | Jiang | | |

FOREIGN PATENT DOCUMENTS

| | | |
|---|---|---|
| CN | 106713554 A | 5/2017 |
| CN | 106875846 A | 6/2017 |
| CN | 106884867 A | 6/2017 |
| CN | 106971673 A | 7/2017 |
| CN | 107526395 A | 12/2017 |
| CN | 108259649 A | 7/2018 |
| CN | 110868486 A | 3/2020 |

OTHER PUBLICATIONS

Office Action for Chinese Application No. 201810135896.2, dated Dec. 2, 2020, 21 pages (includes 10 pages of english translation).
First Search for Chinese Application No. 201810135896.2, 4 pages (includes 2 pages of english translation).

* cited by examiner

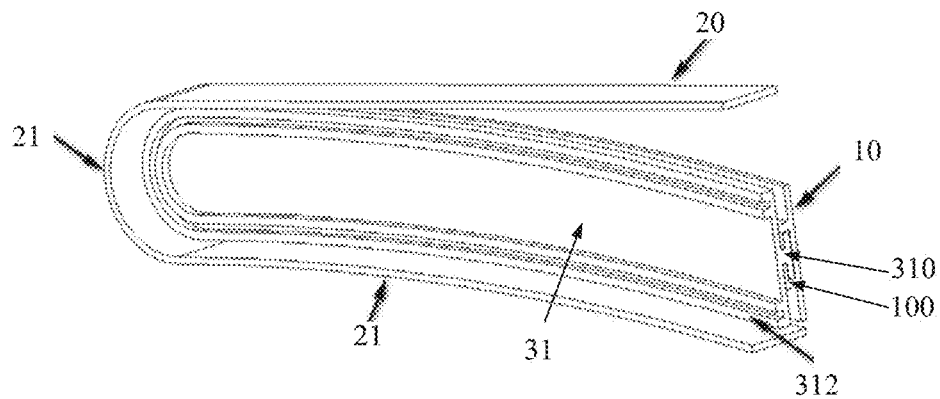
FIG. 29
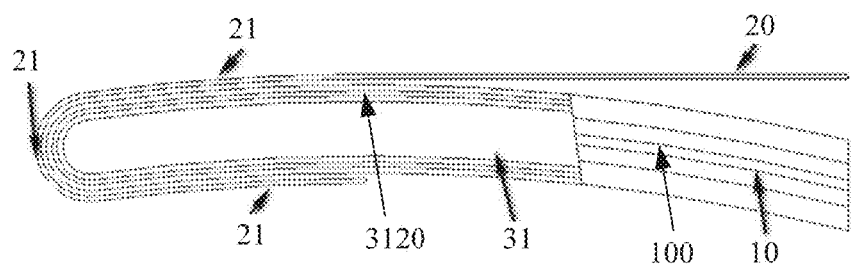
FIG. 30
110: Acquire an instruction to expand a flexible screen or retract the flexible screen
120: Control the action of a movement mechanism according to the instruction to make the expansion portion of the flexible screen perform expansion or retraction
FIG. 31

MOBILE TERMINAL, CONTROL SYSTEM, AND CONTROL METHOD

CROSS-REFERENCE TO RELATED APPLICATION

The present application a national stage filing under 35 U.S.C. § 371 of international application number PCT/CN2018/115196, filed Nov. 13, 2018, which claims priority to Chinese patent application No. CN201810135896.2, filed Feb. 9, 2018. The contents of these applications are incorporated herein by reference in their entirety.

TECHNICAL FIELD

The present disclosure relates to the technical field of mobile terminals, and in particular to a mobile terminal, a control system and a control method.

BACKGROUND

Currently, most mobile terminals, such as smart phones, are still dominated by candy bars. Smart phones with a smaller screen, such as smart phones with an around 5-inch screen, are easy to carry, but the screen is too small to meet people's growing need for audio and video entertainment and other diversified needs. Smart phones with a larger screen, such as smart phones with a 6-inch or even larger screen, have an increased screen size and provide better user experience, but the overall size is large and it is not convenient to carry, and people do not always need a large screen.

In recent years, more and more flexible screens have attracted people's attention. Because of their bendable characteristics, flexible screens have been widely used by designers. However, in most of the technical schemes in which an inflexible screen is used for the purpose of screen expansion, the flexible screen is fixed on two mobile phone housings, and then the two mobile phone housings are connected in different ways. The two connected housings are expanded when a large screen is required and folded when a small screen is required.

These schemes are similar to the schemes for clamshell phones. In fact, the two screens are connected by a "rotating shaft". The clamshell is opened when a large screen is required. These schemes focus on the design of a connecting portion between the two mobile phone housings. However, the use of the bendable characteristics of the flexible screen is limited to a curved portion in the middle of the mobile phone housing. On the housing of the mobile phone, the function of the flexible screen is actually the same as that of an ordinary screen, this greatly limits the use of the bendable characteristics of the flexible screen, and the advantages of the flexible screen cannot be fully exerted. In addition, the expansion of the screen in those schemes is not free enough. Since the technical principle is quite similar to the principle of the clamshell phone, there are actually only two states, i.e., a single-screen state and a dual-screen state. People cannot freely set the size of the screen according to their own preferences.

SUMMARY

The following is a summary of the subject matter described in detail herein. This summary is not intended to limit the protection scope of the claims.

According to an embodiment of the present disclosure, a mobile terminal is provided, which includes a housing and a flexible screen, wherein: the flexible screen includes a fixed portion fixed on the housing and an expansion portion movable relative to the housing;

the mobile terminal further includes a support structure and a movement mechanism, the movement mechanism is configured to drive the expansion portion to move so that at least a part of the expansion portion is driven to move outside the housing; and the movement mechanism is capable of driving the expansion portion to move in an opposite direction so that the expansion portion outside the housing is driven to retract into the housing; and the support structure is configured to support the expansion portion.

Optionally, the support structure includes a support mechanism configured to support the expansion portion, and the movement mechanism indirectly drives the expansion portion to move by driving the support mechanism to move.

Optionally, the support mechanism includes a plurality of support slats, and two adjacent support slats of the plurality of support slats are movably connected; or, the support mechanism includes a support belt or a support plate made of flexible material; or, the support mechanism includes a flexible support belt and a plurality of support slats, and the plurality of support slats are fixed on the flexible support belt.

Optionally, the support structure further includes a sliding support member, the housing includes a fixed housing, the sliding support member is slidably connected to the fixed housing through a sliding pair, the sliding support member is connected with the movement mechanism and capable of moving under the drive of the movement mechanism, and the support mechanism is supported on the sliding support member.

Optionally, a fixed plate is fixedly connected to the fixed housing, the sliding pair includes a sliding portion and a slide rail, the sliding portion is arranged on one of the fixed plate and the sliding support member, and the slide rail is arranged on the other of the fixed plate and the sliding support member.

Optionally, the support structure further includes a slip-off preventing structure that is configured to prevent the sliding support member from slipping off.

Optionally, the slip-off preventing structure includes a first slip-off preventing protrusion fixed on the fixed housing and a second slip-off preventing protrusion fixed on the sliding support member, and during a sliding process of the sliding support member, the first slip-off preventing protrusion is capable of interfering with the movement of the second slip-off preventing protrusion.

Optionally, the support structure is provided with a guide structure capable of guiding the movement of the support mechanism.

Optionally, a guide rail is provided on the sliding support member, and the guide rail includes a plurality of guide segments arranged along a sliding direction of the sliding support member and a connecting segment that connects the plurality of guide segments in sequence; and a guide portion is arranged on the support mechanism, and the guide portion is fitted with the guide rail.

Optionally, a display screen formed by the fixed portion and at least a part of the expansion portion of the flexible screen is a flat display screen or a curved display screen.

Optionally, a display screen formed by the fixed portion and at least a part of the expansion portion of the flexible screen is a flat display screen, the sliding pair includes a slide rail, and the slide rail and the guide segments of the guide rail are all linear; or, a display screen formed by the fixed portion and at least a part of the expansion portion of the flexible screen is a curved display screen, the sliding pair includes a slide rail, and at least one of the guide segment of the guide rail and the slide rail is of a bent and smooth curved shape;

or, a display screen formed by the fixed portion and at least a part of the expansion portion of the flexible screen is a curved display screen, the sliding pair includes a slide rail, the slide rail and the guide segment of the guide rail are all arc-shaped, and centers of the arcs coincide.

Optionally, the housing includes a protective housing that surrounds at least a part of the expansion portion.

Optionally, the housing includes a protective housing which includes a bottom plate, a first side plate, a second side plate and a third side plate, the bottom plate is fixed to the sliding support member, the first side plate and the second side plate are respectively fixed to two opposite sides of the bottom plate, and the first side plate and the second side plate are arranged along the sliding direction of the sliding support member, the third side plate is fixed to an end of the bottom plate away from the sliding support member, and the third side plate is a curved plate with a radian.

Optionally, the movement mechanism includes a power source and a transmission mechanism, the power source is mounted on the housing or the support structure, the power source is connected with the transmission mechanism and drives the transmission mechanism to move, and the transmission mechanism is connected with the support structure and drives the support structure to move.

Optionally, the movement mechanism further includes a locking structure capable of locking the power source.

Optionally, the movement mechanism includes a motor and a transmission mechanism, the motor is mounted on the sliding support member and located on an inner side of the sliding support member, and the motor is connected to the transmission mechanism and drives the transmission mechanism to move, and the transmission mechanism is connected to the support mechanism and drives the support structure to move.

Optionally, the movement mechanism includes a driving portion and a transmission mechanism, the driving portion is mounted on the sliding support member and at least a part of the driving portion protrudes from the outer side of the sliding support member, the motor is connected to the transmission mechanism and drives the transmission mechanism to move, and the transmission mechanism is connected to the support mechanism and drives the support structure to move.

Optionally, the driving portion is telescopically mounted on the sliding support member, and the driving portion is capable of extending outward so that at least a part of the driving portion protrudes from the outer side of the sliding support member, and the driving portion is capable of retracting inward so that at least a part of the driving portion is located in the sliding support member.

Optionally, one of the driving portion and the sliding support member is provided with at least one locking protrusion, and the other is provided with at least one locking groove, the locking protrusion and the locking groove cooperate to lock and fix the driving portion, or the locking protrusion and the locking groove are separated so that the driving portion is capable of acting.

Optionally, the movement mechanism includes two transmission mechanisms which are arranged oppositely and connected by a transmission shaft to make the two transmission mechanisms move synchronously.

Optionally, a limiting structure is fixed on the housing, and the limiting structure is configured to limit and fix an end of the transmission mechanism close to the fixed portion.

Optionally, the limiting structure is a unidirectional limiting structure configured to limit and fix an end of the transmission mechanism close to the fixed portion in response to the expansion portion moving outside the housing; or, the limiting structure is a bidirectional limiting structure configured to limit and fix an end of the transmission mechanism close to the fixed portion in response to the expansion portion moving outside the housing and retracting into the housing.

Optionally, the limiting structure is a unidirectional limiting structure including a limiting protrusion fixed on the housing and an end of the transmission mechanism close to the fixed portion abuts against the limiting protrusion; or, the limiting structure is a bidirectional limiting structure, and the bidirectional limiting structure includes a fixing member that fixedly connects an end of the transmission mechanism close to the fixing portion with the housing.

Optionally, the movement mechanism includes a power source and a transmission mechanism, the power source is mounted on the housing or the support structure, the power source is connected to the transmission mechanism and drives the transmission mechanism to move, and the transmission mechanism is a chain transmission mechanism, a belt transmission mechanism, or a gear toothed belt transmission mechanism; and the support structure includes a support mechanism that is fixed on the chain of the chain transmission mechanism or on the belt of the belt transmission mechanism or on the toothed belt of the gear toothed belt transmission mechanism, and the support mechanism is fixed to the expansion portion and configured to support the expansion portion.

Optionally, the expansion portion is located at both ends of the flexible screen, the fixed portion is located in a middle of the flexible screen, the number of each of the movement mechanism and the support structure is two, and the two movement mechanisms are respectively configured to drive the expansion portions at both ends to move, and the two support structures are respectively configured to support the expansion portions at both ends; or, the expansion portion is located at one end of the flexible screen, the fixed portion is located at the other end of the flexible screen, and the number of each of the movement mechanism and the support structure is one.

Optionally, the expansion portion is located at both ends of the flexible screen, and the fixed portion is located in a middle of the flexible screen;

the number of the movement mechanism is two, and the two movement mechanisms are respectively configured to drive the expansion portions at both ends to move;

the number of the support structure is two, and the two support structures are respectively configured to support the expansion portions at both ends, and the two sliding support members of the two support structures are both slidably connected to the inner surface or the outer surface of the fixed plate, or the two sliding support members of the two support structures are respectively slidably connected to the inner surface and the outer surface of the fixed plate.

Optionally, the mobile terminal further includes a detection device configured to detect the degree of expansion of the flexible screen.

Optionally, a distance sensor is mounted on the sliding support member, an auxiliary detection device is arranged on the main board of the mobile terminal, and the auxiliary detection device cooperates with the distance sensor to detect a sliding distance of the sliding support member.

According to an embodiment of the present disclosure, a control system is provided, which is configured to control the expansion and retraction of the flexible screen of the mobile terminal mentioned above, which includes:

an instruction input unit configured to receive an instruction to expand the flexible screen or retract the flexible screen; and a control unit configured to control the action of the movement mechanism according to the instruction.

Optionally, the instruction input unit includes two keys configured to control the expansion of the flexible screen and the retraction of the flexible screen, respectively.

Optionally, the control system further includes a display processing unit configured to receive a result of detection on the degree of expansion of the flexible screen by a detection device and display the result on the display screen of the mobile terminal; and the detection device is arranged on the mobile terminal to detect the degree of expansion of the flexible screen.

Optionally, the control unit controlling the action of the movement mechanism according to the instruction includes:

the control unit controls the movement mechanism to stop acting in response to the instruction being an instruction to expand the flexible screen and the result of detection being that the degree of expansion of the flexible screen reaches the maximum; and the control unit controls the movement mechanism to stop acting in response to the instruction being an instruction to retract the flexible screen and the result of detection being that the degree of expansion of the flexible screen reaches the minimum.

Optionally, the instruction contains the degree of expansion specified for the flexible screen; and the control unit controlling the action of the movement mechanism according to the instruction includes:

in response to the degree of expansion of the flexible screen detected by the detection device being inconsistent with the specified degree of expansion, the movement mechanism is controlled to act to adjust the degree of expansion of the flexible screen to the specified degree of expansion.

According to an embodiment of the present disclosure, a control method is provided for controlling the expansion and retraction of the flexible screen of the mobile terminal mentioned above, which includes:

acquiring an instruction to expand the flexible screen or retract the flexible screen; and controlling, according to the instruction, the movement mechanism to act to make the expansion portion of the flexible screen perform expansion or retraction movement.

Optionally, the mobile terminal further includes a detection device configured to detect the degree of expansion of the flexible screen; and the control method further includes:

controlling the movement mechanism to stop acting in response to the instruction being an instruction to expand the flexible screen and the detection device detecting that the degree of expansion of the flexible screen reaches the maximum; and controlling the movement mechanism to stop acting in response to the instruction being an instruction to retract the flexible screen and the detection device detecting that the degree of expansion of the flexible screen reaches the minimum.

Optionally, the mobile terminal further includes a detection device configured to detect the degree of expansion of the flexible screen; wherein the instruction contains the degree of expansion specified for the flexible screen; and the control method further includes:

controlling the movement mechanism to act to adjust the degree of expansion of the flexible screen to the specified degree of expansion in response to the degree of expansion of the flexible screen detected by the detection device being inconsistent with the specified degree of expansion.

BRIEF DESCRIPTION OF DRAWINGS

FIG. 29 is a schematic structural diagram showing fitting of the flexible screen, the sliding support member, and the fixed plate when the mobile terminal is in the narrow-screen mode according to Embodiment five of the present disclosure;

FIG. 30 is a schematic structural diagram showing fitting of the flexible screen, the sliding support member, and the fixed plate when the mobile terminal of FIG. 29 is in the wide-screen mode;

FIG. 31 is a schematic flowchart of a flexible screen control method according to Embodiment six of the present disclosure;

REFERENCE NUMERALS IN FIGS. 1-30

1: fixed housing; 10: fixed plate; 100, 100': slide rail; 101: first slip-off preventing protrusion; 11: limiting protrusion; 2: flexible screen; 20: fixed portion; 21, 21': expansion portion; 30: support slat; 31, 31': sliding support plate; 310: sliding portion; 311: second slip-off preventing protrusion; 312: guide rail; 3120: guide segment; 3121: connecting segment; 313: mounting hole; 314: locking groove; 32: protective housing; 320: bottom plate; 321: first side plate; 322: second side plate; 323: third side plate; 40: driving portion; 400: rotation limiting structure; 401: locking protrusion; 41: chain wheel; 410: rotation limiting structure; 42: transmission shaft; 420, 421: rotation limiting structure; 43: chain; 430: inner chain plate; 431: outer chain plate; and 432: pin shaft.

DETAILED DESCRIPTION

Objects, technical schemes and advantages of the present application will be clearer from a detailed description of embodiments of the present application in conjunction with the drawings. It should be noted that if not in collision, the embodiments and features therein in the present application may be combined with each other.

Embodiment One

As shown in FIGS. 1-20, in this embodiment, a mobile terminal is provided, including a housing and a flexible screen 2. The flexible screen 2 includes a fixed portion 20 fixed on the housing and an expansion portion 21 movable relative to the housing.

The mobile terminal further includes a movement mechanism which can drive the expansion portion 21 to move to enable at least a part of the expansion portion 21 to move outside the housing. In this case, the part of the expansion portion 21 outside the housing and facing upward and the fixed portion 20 form the display screen of the mobile terminal, and the mobile terminal is in the wide-screen mode. Furthermore, the movement mechanism can also drive the expansion portion 21 to move in an opposite direction to retract the part of the expansion portion 21 outside the housing into the housing. In this case, the fixed portion 20 forms the display screen of the mobile terminal and the mobile terminal is in a narrow-screen mode.

Figure 4:
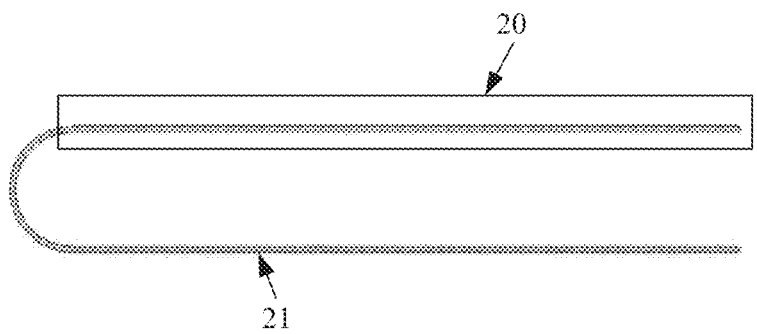
FIG. 4 is a schematic structural diagram of the flexible screen of FIG. 3.
Figure 5:
FIGS. 5 and 6 are schematic diagrams of two states of the flexible screen and the housing when the mobile terminal of FIG. 1 is in the wide-screen mode.
Figure 6:
Figure 7:
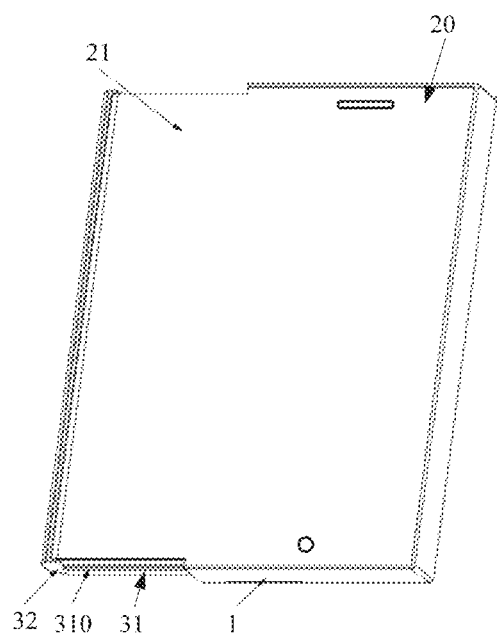
FIG. 7 is a stereoscopic schematic structural diagram of the mobile terminal of FIG. 1 in the wide-screen mode.

Specifically, the structure of the flexible screen 2 is shown in FIG. 4, where the portion inside the rectangular frame is the fixed portion 20, and the portion outside the rectangular frame is the expansion portion 21.

As shown in FIGS. 1-3, 5 and 6, the housing includes a fixed housing 1. When the flexible screen 2 is in the narrow-screen mode or wide-screen mode, the fixed portion 20 of the flexible screen 2 is always fixed on an upper surface of the fixed housing 1.

Figure 1:
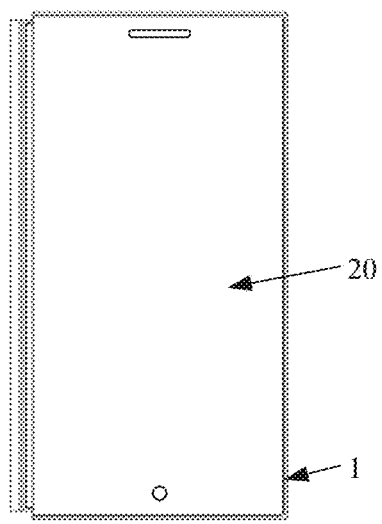
FIG. 1 is a schematic structural diagram of a mobile terminal in a narrow-screen mode according to Embodiment one of the present disclosure.
Figure 2:
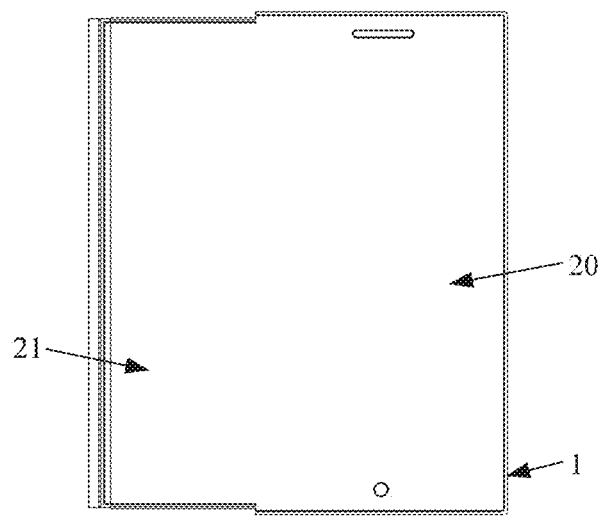
FIG. 2 is a schematic structural diagram of the mobile terminal of FIG. 1 in a wide-screen mode.
Figure 3:
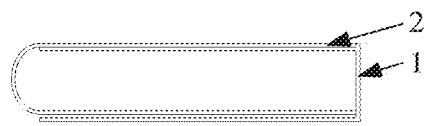
FIG. 3 is a schematic diagram of the state of the flexible screen and the housing when the mobile terminal of FIG. 1 is in the narrow-screen mode.

The expansion portion 21 of the flexible screen 2 can move relative to the housing, and the display screen can be switched between the wide-screen mode and the narrow-screen mode through the expansion or retraction of the expansion portion 21. As shown in FIGS. 1 and 3, when the flexible screen 2 is in the narrow-screen mode, that is, when the expansion portion 21 is in the retracted state, the expansion portion 21 of the flexible screen 2 is hidden inside the housing and cannot be used to display information, only the fixed portion 20 of the flexible screen 2 can be used to display information. Therefore, in this case, the fixed portion 20 forms the display screen. When the display screen needs to be expanded, at least a part of the expansion portion 21 will gradually move outside the housing under the drive of the movement mechanism, for example moving to and laying at a position horizontal to the fixed portion 20, to complete the expansion of the flexible screen 2. In this case, both the part of the expansion portion 21 moving outside the housing and facing upward, and the fixed portion 20 can be used to display information, and thus form the display screen of the mobile terminal together, so that the mobile terminal is in the wide-screen mode. When the flexible screen 2 needs to be retracted, the retraction can be completed simply by driving the expansion portion 21 of the flexible screen 2 to move in an opposite direction (a direction opposite to the movement direction when the flexible screen 2 is expanded) by the movement mechanism.

In this embodiment, when the expansion portion 21 is fully expanded, the display screen can reach the maximum, and when the expansion portion 21 is fully retracted, the display screen can reach the minimum. The display screen at the maximum may have a width twice that of the display screen at the minimum.

In the mobile terminal of this embodiment, the expansion portion 21 of the flexible screen 2 is driven by the movement mechanism to perform expansion and retraction, so that the mobile terminal can be switched between the wide-screen mode and the narrow-screen mode; and the expansion portion 21 can be continuously expanded so that the display screen can be in any size between the maximum size and the minimum size, which can meet different requirements of users on the size of the display screen in different situations and improve the user experience.

The mobile terminal further includes a support structure. The support structure is at least configured to support the expansion portion 21 that moves outside the housing, so as to support the user' touch or other operations on the expansion portion 21, and the expansion portion 21 will not be significantly deformed, thereby ensuring the reliability and strength of the flexible screen structure.

Optionally, the support structure includes a deformable support mechanism. The support mechanism is fixed to the expansion portion 21 and configured to support the expansion portion 21, and the support mechanism is connected with the movement mechanism and can move under the drive of the movement mechanism.

The support mechanism, on one hand, can support the expansion portion 21 so that the user can touch the expansion portion 21 after the expansion portion 21 moves outside the housing; on the other hand, it is flexible and deformable, so during the expansion or retraction of the expansion portion 21, the support mechanism fixed to the expansion portion 21 can move and deform accordingly, and perform the expansion or retraction together with the expansion portion 21.

The movement mechanism is connected with the support mechanism, so that the expansion portion 21 can be driven to move by driving the support mechanism to move. The movement mechanism is directly connected to the support mechanism, rather than directly connected to the expansion portion 21. On one hand, the connection operation of the power structure with the support mechanism is more convenient and easy to implement; on the other hand, it makes the disassembly of the flexible screen 2 convenient to facilitate replacement of the flexible screen 2 by the user.

The support mechanism should have a support function, and at the same time, the whole support mechanism should be flexible. To achieve this, there are two ways, one is to splice with rigid material; and the other is to use flexible material, for example, belts, flexible plates, etc.

Figure 8:
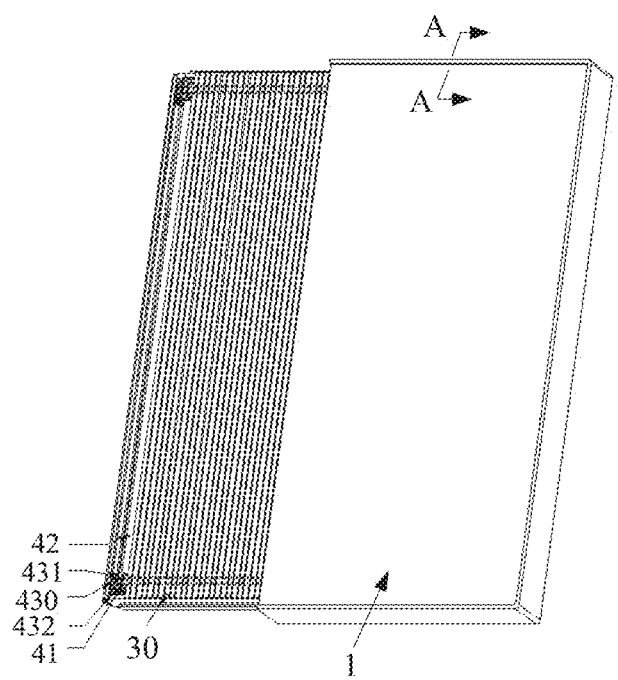
FIG. 8 is a stereoscopic schematic structural diagram of the mobile terminal of FIG. 7, when viewed from the bottom.
Figure 10:
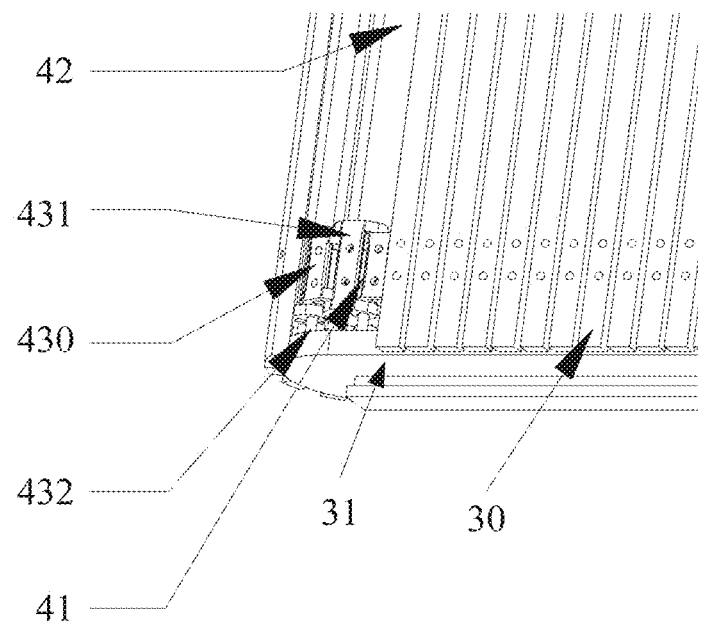
FIG. 10 is a partial schematic diagram of FIG. 8.

Specifically, in this embodiment, the support mechanism is implemented in the first way. As shown in FIGS. 8 and 10, the support mechanism is a crawler-like structure, including a plurality of support slats 30. The plurality of support slats 30 have a length direction perpendicular to a movement direction of the support mechanism, and the plurality of support slats 30 are movably connected in sequence so that adjacent support slats can move relative to each other (that is, a connection structure between adjacent support slats allows the adjacent support slats to have relative movement). In this way, the support mechanism as a whole can be deformed, so that, under the driving of the movement mechanism, the support mechanism and the expansion portion 21 of the flexible screen 2 can expand and retract together. In addition, the support slats 30 have certain rigidity, so that the support mechanism formed by the plurality of support slats 30 also has certain rigidity, and can support the expansion portion 21 of the flexible screen 2 to allow operations on the expansion portion 21.

The plurality of support slats 30 can be movably connected in the following two ways: the plurality of support slats 30 are hinged in sequence to realize the movable connection; or, the plurality of support slats 30 are fixed on a flexible support belt which is flexible and deformable, so that the plurality of support slats 30 fixed on the flexible support belt can move relative to each other, thereby realizing the movable connection of the plurality of support slats 30.

It should be understood that the support mechanism may further include a flexible support belt or a flexible support plate wholly made of flexible material, and the flexible support belt or flexible support plate needs to have sufficient support strength to be able to support touch operations on the expansion portion 21.

Optionally, the support structure further includes a sliding support member. The housing includes a fixed housing 1. The sliding support member and the fixed housing 1 are slidably connected by a sliding pair, and the sliding support member is connected to the movement mechanism and can be driven by the movement mechanism to move. The support mechanism is supported on the sliding support member.

When the movement mechanism drives the expansion portion 21 of the flexible screen 2 and the support mechanism to expand, the sliding support member also slides relative to the fixed housing 1 under the drive of the movement mechanism, and the sliding action of the sliding support member is adapted to the expansion action of the support mechanism so that the sliding support member supports the support mechanism and further facilitates the support of the support mechanism to the expansion portion 21.

Figure 9:
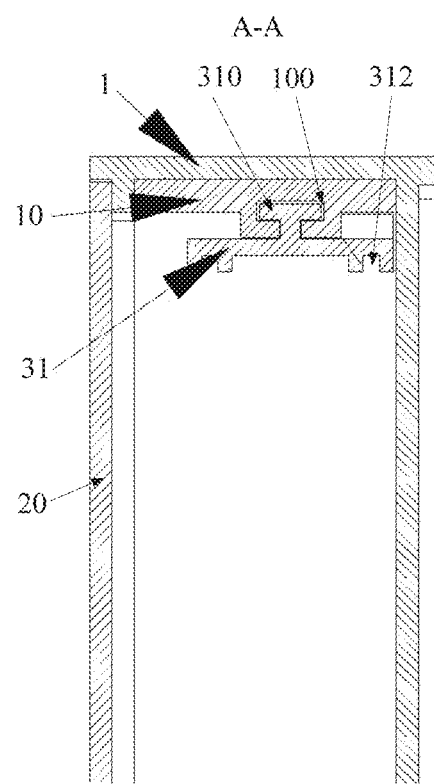
FIG. 9 is a schematic cross-sectional structural diagram of FIG. 8 taken along line A-A.
Figure 11:
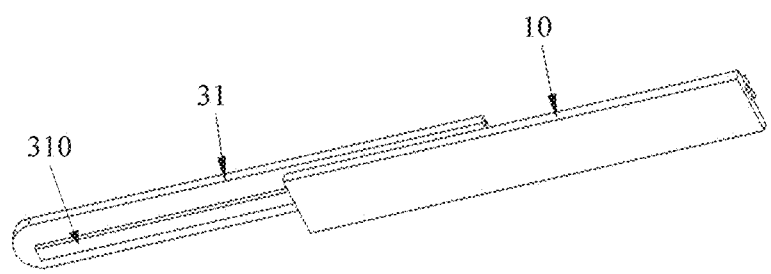
FIG. 11 is a schematic structural diagram showing fitting of a sliding support member and a fixed plate in the mobile terminal of FIG. 1.

Specifically, in this embodiment, as shown in FIGS. 9 and 11, a fixed plate 10 is fixedly connected to the fixed housing 1, and a slide rail 100 is arranged on the fixed plate 10. The sliding support member is a sliding support plate 31 made of material with high rigidity and strength to ensure its structural reliability, and the sliding support plate 31 is provided with a protruding sliding portion 310 which is slidably fitted with the slide rail 100 to form a sliding pair. The sliding support plate 31 can slide relative to the fixed housing 1. When the flexible screen 2 is expanded, the sliding support plate 31 slides to a corresponding position in the fixed plate 10 to support related structures of the expanded flexible screen. For example, the support mechanism that moves outside the housing can be supported on an upper surface of the sliding support plate 31 (see FIG. 10).

It should be understood that a sliding portion 310 may be provided on the fixed plate 10 and a slide rail 100 may be provided on the sliding support plate 31.

In order to prevent the sliding support plate 31 from detaching from the fixed plate 10 when it slides, a slip-off preventing structure is provided to prevent the sliding support plate 31 from slipping off.

Figure 12:
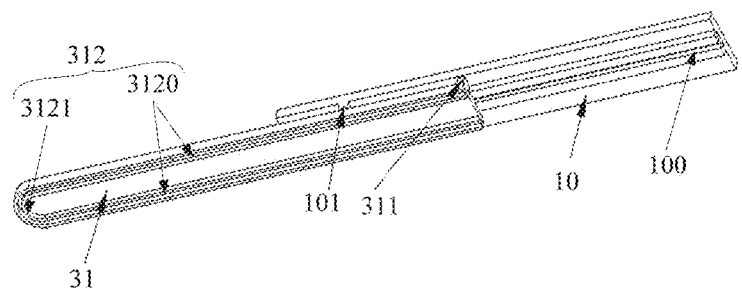
FIG. 12 is a schematic structural diagram, from another perspective, of an assembly structure of the sliding support member and the fixed plate of FIG. 11.

Optionally, as shown in FIG. 12, the slip-off preventing structure includes a first slip-off preventing protrusion 101 fixed on the fixed housing 1 and a second slip-off preventing protrusion 311 fixed on the sliding support plate 31.

During the sliding process of the sliding support plate 31, the first slip-off preventing protrusion 101 can interfere with the movement of the second slip-off preventing protrusion 311, preventing the sliding support plate 31 from continuing to slide to separate from the fixed plate 10. The first slip-off preventing protrusion 101 and the second slip-off preventing protrusion 311 can limit a sliding distance of the sliding support plate 21, so that the expansion portion can be expanded within a relatively reliable range. This ensures that the flexible screen 2 can be expanded, and also ensures the stability and reliability of the entire display screen structure after the expansion.

It should be understood that other forms of slip-off preventing structure can also be used. For example, an opening end of the slide rail 100 is designed to be closed, and when the sliding support plate 31 slides to abut against the closed end, the closed end prevents the sliding support plate 31 from continuing to slide to separate from the fixed plate 10.

Optionally, a guide structure capable of guiding the movement of the flexible support plate is provided on the support structure. In this way, when the movement mechanism drives the flexible support plate to move, the guide structure makes the flexible support plate and the expansion portion 21 of the flexible screen 2 move along a specific track, so that the expansion and retraction of the expansion portion 21 of the flexible screen 2 can be performed more smoothly.

Figure 13:
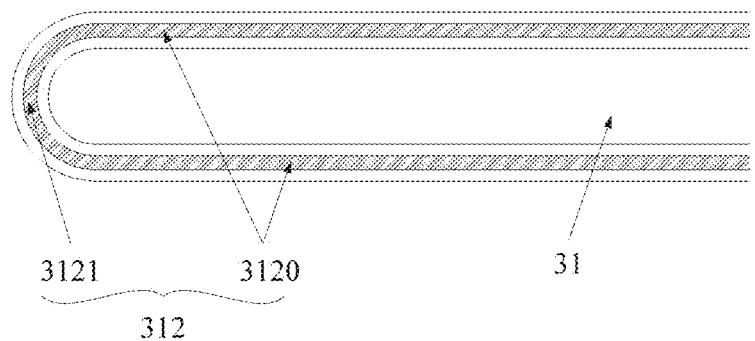
FIG. 13 is a partial schematic structural diagram of the sliding support member of FIG. 12.

Specifically, as shown in FIG. 13, in this embodiment, a guide rail 312 is provided on the sliding support plate 31. The guide rail 312 is roughly racetrack-shaped as a whole, and includes two guide segments 3120 which are arranged along a sliding direction of the sliding support plate 31 and a connecting segment 3121 that connects the two guide segments 3120. Optionally, the connecting segment 3121 has an arc shape. Further, the support mechanism is provided with a guide portion cooperates with the guide rail 312 to guide the movement of the support mechanism, and further guide the expansion portion 21 fixed on the support mechanism, so that the support mechanism and the expansion portion 21 move on a defined track.

It should be understood that the guide rail 312 is not limited to including two guide segments 3120, but may comprise more than two guide segments 3120, and the connecting segment 3121 connects more than two guide segments 3120 in sequence. Alternatively, the guide rail 312 may also have other shapes.

Preferably, in order to better support the support mechanism, a plurality of sliding support plates 31 may be provided. Specifically, as in this embodiment, the expansion portion 21 of the flexible screen 2 can be expanded on the left side of the fixed portion 20, and the support slats 30 of the support mechanism are arranged in the front-rear direction. Therefore, it is necessary to provide front and rear sliding support plates 31 to respectively support the front and rear ends of the support slats 30. Further, a fixed plate 10 is provided on each of the front and rear ends of the fixed housing 1, so as to be slidably connected to the front and rear sliding support plates 31, as shown in FIG. 17.

Optionally, the housing includes a protective housing 32 that surrounds at least a part of the expansion portion 21 to protect the expansion portion 21 of the display screen, for example, to protect the expansion portion 21 of the flexible screen in the wide-screen mode, in order to avoid unexpected damage to the flexible screen.

Figure 14:
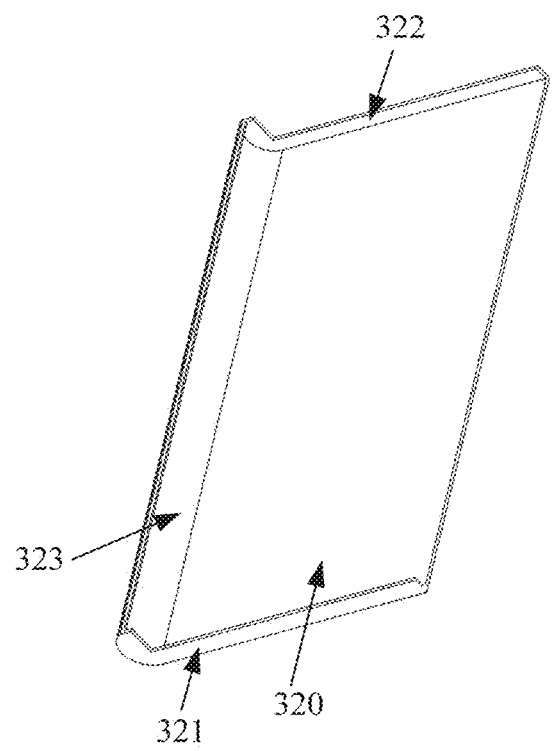
FIG. 14 is a schematic structural diagram of a protective housing in the mobile terminal of FIG. 1.
Figure 17:
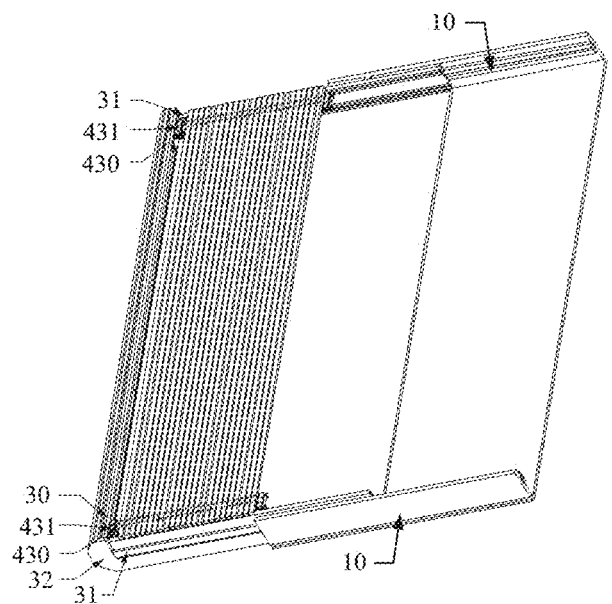
FIG. 17 is a schematic diagram of an assembly structure of the support member and a movement mechanism in the mobile terminal of FIG. 1.
Figure 18:
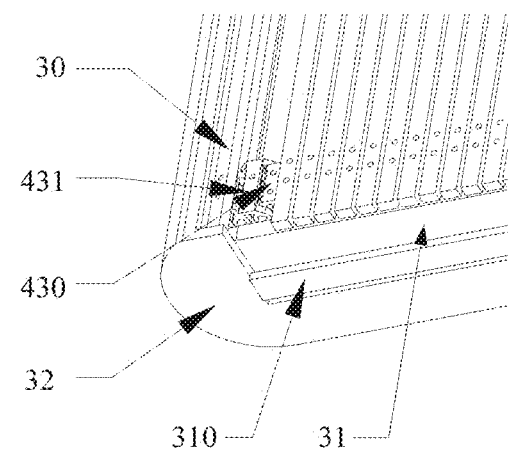
FIG. 18 is a partial schematic structural diagram of FIG. 17.

Specifically, in this embodiment, as shown in FIGS. 14, 17 and 18, the protective housing 32 includes a bottom plate 320, a first side plate 321, a second side plate 322 and a third side plate 323. The first side plate 321 and the second side plate 322 are respectively fixed to the front and rear ends of the bottom plate 320, and the first side plate 321 and the second side plate 322 are substantially perpendicular to the bottom plate 320. The first side plate 321 and the second side plate 322 are arranged along the sliding direction of the sliding support plate 31. The third side plate 323 is fixed to a left end of the bottom plate 320, and the third side plate 323 is a curved plate with a radian.

Further, the front and rear ends of the protective housing 32 are respectively fixed to the front and rear sliding support plates 31 (for example, by means of metal glue). Specifically, the front and rear ends of the bottom plate 320 may be respectively fixed to the front and rear sliding support plates 31, and/or the first side plate 321 and the second side plate 322 may be respectively fixed to the front and rear sliding support plates 31.

In the wide-screen mode and the narrow-screen mode, the left side and the back side of the expansion portion 21 are hidden in the protective housing 32, so that the protective housing correspondingly protect the expansion portion 21. Meanwhile, the provision of the protective housing makes the overall appearance more attractive.

Optionally, the movement mechanism includes a power source and a transmission mechanism. The power source is mounted on the housing or the support structure, the power source is connected to the transmission mechanism and drives the transmission mechanism to move, and the transmission mechanism is connected to the support structure and drives the support structure to move.

Specifically, in this embodiment, the movement mechanism includes a motor. The motor is mounted on the sliding support plate 31 and located on an inner side of the sliding support plate 31. After powered-on, the motor rotates and drives the transmission mechanism to move, and the transmission mechanism in turn drives the support mechanism and the expansion portion 21 on the support mechanism to perform expansion and retraction.

The use of a motor to provide power can automate the expansion and retraction process of the flexible screen, and the uniform application of force during the movement process has obvious advantages in terms of user experience and service life protection of the flexible screen.

Optionally, the transmission mechanism is a chain transmission mechanism or a belt transmission mechanism or a gear toothed belt transmission mechanism.

Figure 15:
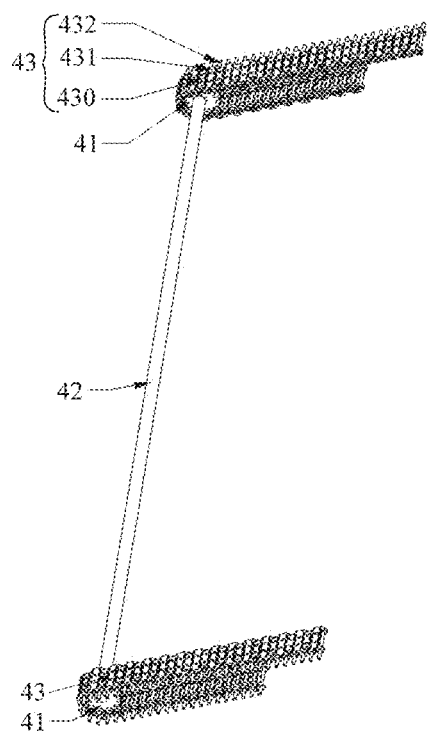
FIG. 15 is a schematic structural diagram of a transmission mechanism in the mobile terminal of FIG. 1.
Figure 16:
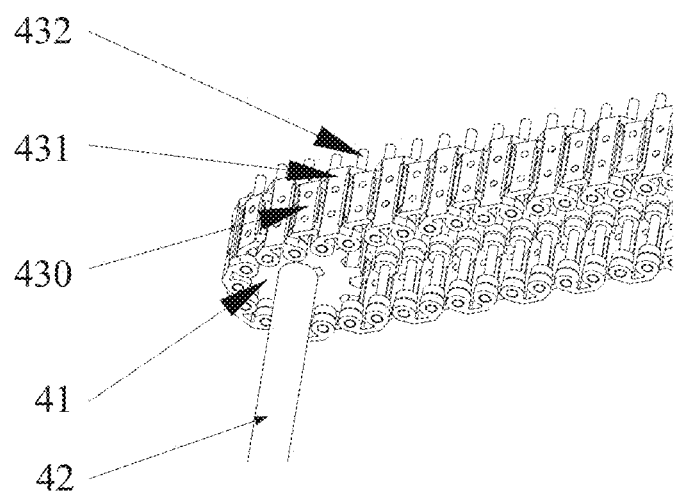
FIG. 16 is a partial schematic structural diagram of FIG. 15.

Specifically, in this embodiment, as shown in FIGS. 15 and 16, the transmission mechanism is a chain transmission mechanism which specifically includes a chain wheel 41 and a chain 43. The chain wheel 41 is mounted on the sliding support plate 31, and the chain 43 is meshed with the chain wheel 41.

Further, the chain 43 includes an outer chain plate 431 and an inner chain plate 430, which are alternately arranged, and a pin shaft 432 that rotatably connects the outer chain plate 431 and the inner chain plate 430. The support slats 30 of the support mechanism are fixed (for example, fixedly connected by rivets or fixedly connected by welding) on the outer chain plate 431 and the inner chain plate 430.

When the expansion portion 21 of the flexible screen 2 expands, the motor drives the chain wheel 41 to rotate, and the chain wheel 41 in turn drives the chain 43 to move, thereby driving the support mechanism fixed on the chain plate to move, and the support mechanism drives the expansion portion 21 fixed thereon to expand. When the expansion portion 21 of the flexible screen 2 retracts, the motor rotates in an opposite direction and drives the chain wheel 41 to rotate in the opposite direction. The chain wheel 41 drives the chain 43 to move in the opposite direction, thereby driving the support mechanism fixed on the chain plate to move in the opposite direction. The support mechanism drives the expansion portion 21 fixed thereon to retract in the opposite direction.

Specifically, in this embodiment, as shown in FIG. 16, one end of the pin shaft 432 of the chain transmission mechanism protrudes from the outer chain plate 431 and the inner chain plate 430, and the protruding portion of the pin shaft 432 may act as a guide portion which cooperates with the guide rail 312 on the sliding support plate 31 to play a guide role. The guide rail 312 provides movement restriction for the pin shaft 432 in the chain transmission mechanism, so that the pin shaft 432 moves on a defined track and thus the movement of the entire chain transmission mechanism is smoother and more reliable, thereby realizing the expansion and retraction of the core, namely the chain 43, of the entire chain transmission mechanism, and further driving the support mechanism and the flexible screen 2 to realize expansion and retraction. It should be noted that the support slats 30 of the support mechanism are fixed on the chain 43 through which the flexible connection of the plurality of support slats 30 is realized. Therefore, the chain 43 can be regarded as the connecting mechanism of the support mechanism. So, when the protruding portion of the pin shaft 432 serves as the guide portion, it can be regarded as a guide portion provided on the support mechanism.

It should be understood that the guide portion is not limited to the protruding portion of the pin shaft 432, and may also be in other forms. For example, a guide portion may be directly provided on the support slats 30, or a guide portion is additionally provided on the chain transmission mechanism.

Optionally, the power mechanism includes two chain transmission mechanisms, and the chain wheels 41 of the two chain transmission mechanisms are connected by a transmission shaft 42.

Specifically, as shown in FIGS. 15 and 17, the front and rear ends of the transmission shaft 42 are respectively supported on the front and rear sliding support plates 31, the two chain transmission mechanisms are arranged one behind the other, and the chain wheels 41 of the two chain transmission mechanisms are respectively mounted on the front and rear ends of the transmission shaft 42. The front and rear ends of the support slats 30 of the support mechanism are respectively fixed on the chains 43 of the two chain transmission mechanisms.

The provision of the transmission shaft 42 ensures that the rotation between the two chain wheels 41 is synchronized, thereby ensuring the synchronized movement of the two chains 43 and further ensuring that the front and rear ends of the support mechanism and the expansion portion 21 on it are synchronized to avoid distortion of the expansion portion 21 due to the obvious transmission misalignment between the front and rear chains 43. In order to ensure that the transmission shaft 42 can synchronously transfer movement between the two chain wheels 41, it needs to be made of relatively rigid material.

It should be noted that, in order to ensure that the expansion portion 21 will not be expanded or retracted due to the leftward and rightward sliding operations when the display screen is operated, the display screen needs to be locked. The display screen can be locked by locking the movement mechanism Specifically, for example, a motor with a locking function can be used to limit and fix the chain transmission mechanism through the self-locking of the motor, and then the expansion portion 21 can be fixed to lock the display screen. Alternatively, the chain transmission mechanism may be locked by the frictional force generated during the transmission of the chain wheel 41 and chain 43, thereby realizing the locking of the display screen.

Optionally, a limiting structure is fixed on the fixed housing 1, and the limiting structure limits and fixes an end of the chain transmission mechanism close to the fixed portion 20.

Optionally, in an example, the limiting structure may be a unidirectional limiting structure which is configured to limit and fix an end of the chain transmission mechanism close to the fixed portion 20 when the expansion portion 21 moves outward, and not limit and fix the end of the chain transmission mechanism close to the fixed portion 20 when the expansion portion 21 moves inward.

Figure 19:
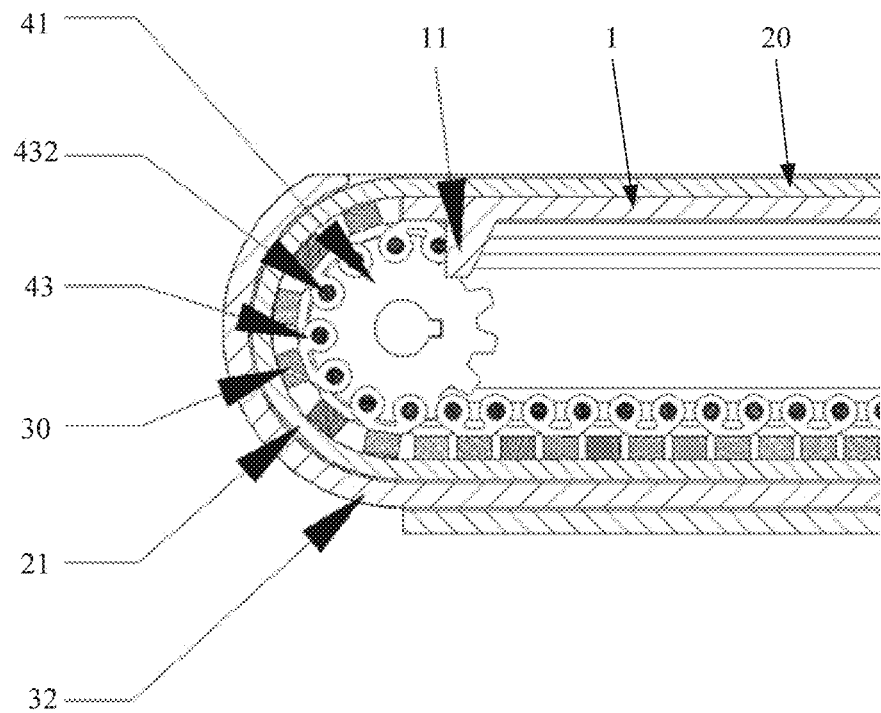
FIG. 19 is a partial schematic cross-sectional structural diagram of the mobile terminal of FIG. 1 in the narrow-screen mode.
Figure 20:
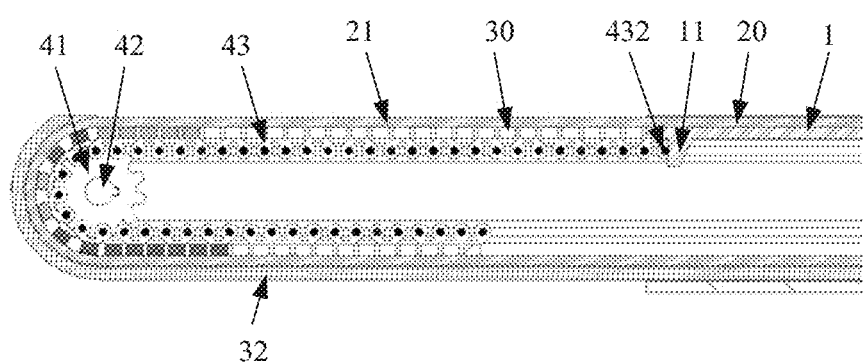
FIG. 20 is a partial schematic diagram of the mobile terminal of FIG. 1 in the wide-screen mode.

Specifically, in this embodiment, as shown in FIGS. 19 and 20, the limiting structure is a unidirectional limiting structure. The unidirectional limiting structure includes a limiting protrusion 11. The limiting protrusion 11 is provided on the fixed housing 1 to limit the movement of a pin shaft 432 located on the uppermost side of the chain transmission mechanism close to the edge and keep the pin shaft 432 stationary during the expansion of the expansion portion 21 of the flexible screen 2. Specifically, the motor drives the chain wheel 41 to rotate clockwise, and the chain wheel 41 drives the chain 43 to drive clockwise. The pin shaft 432 located on the uppermost side close to the edge is limited by the limiting protrusion 11 on the fixed housing 1 and cannot move to the right, so the entire chain 43 will expand to the left under the thrust of the limiting protrusion 11. The expansion of the chain 43 to the right will synchronously drive the support mechanism, the expansion portion 21 of the flexible screen 2 and the sliding support plate 31 to expand to the left. The above process is the expansion process of the expansion portion 21 of the flexible screen 2.

The retraction process of the expansion portion 21 of the flexible screen 2 is just opposite to the expansion process of the expansion portion 21 of the flexible screen 2. First, the motor rotates counterclockwise, and drives the chain wheel 41 to rotate counterclockwise, which in turn drives the chain 43, the support mechanism, the expansion portion 21 of the flexible screen 2, and the sliding support plate 31 to move counterclockwise. Since the expansion portion 21 of the flexible screen 2 is fixedly connected to the fixed portion 20, the connection force limits the leftward movement of the expansion portion 21. Therefore, the chain 43, the support mechanism, the expansion portion 21 below, and the sliding support plate 31 are housed in the fixed housing 1. The above process is the retraction process of the expansion portion 21 of the flexible screen 2.

The difference between the retraction process of the expansion portion 21 of the flexible screen 2 and the expansion process of the expansion portion 21 of the flexible screen 2 lies in that, during the retraction process, the limiting protrusion 11 on the fixed housing 1 does not play the limiting and fixation role. Instead, the retraction process relies on the connection between the expansion portion 21 and the fixed portion 20.

Optionally, in another example, the limiting structure may be a bidirectional limiting structure configured to limit an end of the chain transmission mechanism close to the fixed portion 20 when the expansion portion 21 moves outward and inward.

Specifically, for example, the bidirectional limiting structure may include a fixing member that fixedly connects a pin shaft 432 on the uppermost side of the chain transmission mechanism close to the edge with the fixed housing 1.

As an alternative, when the transmission mechanism is a belt transmission mechanism, it is just needed to replace the chain wheel with a belt wheel and replace the chain with a belt; or, when the transmission mechanism is a gear toothed belt transmission mechanism, it is just needed to replace the chain wheel with a gear and replace the chain with a toothed belt.

Further, if the belt or toothed belt is stretched to a certain extent, it can meet the requirement of supporting the flexible screen. The belt or toothed belt can be used as a support mechanism and also as a transmission mechanism to further simplify the structure of the mobile terminal.

Optionally, in this embodiment, the display screen of the mobile terminal is a flat display screen.

In order to ensure that the display screen of the mobile terminal is a flat display screen, the guide segments 3120 of the slide rail 100 on the fixed plate 10 and the guide rail 312 on the sliding support plate 31 are all linear. As shown in FIG. 12, the slide rail 100 on the fixed plate 10 is horizontal and straight, so that the sliding support plate 31 slides horizontally and linearly with respect to the fixed housing 1. As shown in FIG. 13, the guide segments 3120 of the guide rail 312 on the sliding support plate 31 are horizontal and linear, so that the support mechanism moving outside the housing is also horizontal, thereby ensuring that the expansion portion 21 supported on the support mechanism is horizontal. In this way, in the wide-screen mode, the expansion portion 21 outside the housing is horizontal to the fixed portion 20, so that the display screen formed by the fixed portion 20 and at least a part of the expansion portion 21 is a flat display screen.

Optionally, the mobile terminal further includes a detection device which is configured to detect the degree of expansion of the flexible screen 2.

Specifically, the detection device may include a distance sensor and an auxiliary detection device. The distance sensor may emit a detection pulse, and the auxiliary detection device may receive the detection pulse and calculate the distance by measuring the time from the transmission to the reception of the detection pulse. The distance sensor may be mounted on the sliding support plate 31, and the auxiliary detection device is arranged on the main board of the mobile terminal. By detecting the distance between the distance sensor and the auxiliary detection device, the distance of the sliding support plate 31 protruding from the fixed housing 1 can be obtained, and then the degree of expansion of the expansion portion 21 of the flexible screen 2, i.e., the degree of expansion of the flexible screen 2, can be obtained. In this way, the size of the display screen is obtained.

Optionally, the mobile terminal further includes a display module configured to display the degree of expansion of the flexible screen 2.

Optionally, the expansion and retraction of the expansion portion 21 of the flexible screen 2 can be automatically controlled. Specifically, the mobile terminal further includes an automatic control module, and the automatic control module includes an instruction input unit and a control unit. The instruction input unit is configured to receive an instruction to expand or retract the flexible screen 2. The control unit is configured to control the motor action of the movement mechanism according to the instruction, so that the expansion portion 21 of the flexible screen 2 performs corresponding expansion or retraction.

Optionally, the instruction input unit includes two keys configured to control the expansion of the flexible screen 2 and the retraction of the flexible screen 2, respectively. Specifically, the two keys may be physical keys, for example, they may be arranged on the fixed housing 1; or may be two virtual keys on the software corresponding to the automatic control module, to realize one-key control of expansion and retraction of the flexible screen.

Optionally, when the detection device detects that the actual degree of expansion of the flexible screen 2 is inconsistent with the instruction input by the user, the control unit may control the motor of the movement mechanism to act to adjust the actual degree of expansion of the flexible screen 2, so as to make the actual degree of expansion consistent with the instruction input by the user.

Optionally, when the detection device detects that the actual degree of expansion of the flexible screen 2 reaches the maximum, and the input instruction at this time is still an instruction to expand the flexible screen 2, the motor will not act; or when the detection device detects that the degree of expansion of the expansion portion 21 reaches the minimum, and the input instruction is still an instruction to retract the flexible screen 2, the motor will not act.

In this embodiment, with the provision of the support structure and the movement mechanism, and due to the advantages of the flexible screen, the continuous expansion and retraction of the flexible screen is realized, so that the display screen can be freely switched between the large-screen mode and the small-screen mode. Users can freely set the size of the display screen within a certain range to meet different usage requirements to meet the increasingly abundant needs of people.

In this embodiment, a detection device is further provided to determine the expansion percentage of the flexible screen, that is, to determine the size of the display screen. The detection device can be implemented by a distance sensor and a corresponding auxiliary detection device.

In the embodiment of the present application, an automatic control module is further provided and implemented by software control. It is just needed to provide two keys (to expand the flexible screen and to retract the flexible screen) on the software interface, and also a display module which is provided for the user to know the degree of expansion of the flexible screen. The control operation is simple.

It should be understood that, in addition to the support mechanism and sliding support plate described in this embodiment, the support structure may be in other forms, for example, a rigid support plate and a sliding support plate. In the wide-screen mode, the rigid support plate may move outside the housing along with the sliding of the sliding support plate and support the expansion portion that moves outside the housing. In the narrow-screen mode, the rigid support plate can move into the housing along with the sliding of the sliding support plate.

Embodiment Two

In this embodiment, a mobile terminal is provided, which differs from the mobile terminal described in the Embodiment one mainly in that, in this embodiment, the power source of the movement control mechanism is a manually-driven power source.

Figure 21:
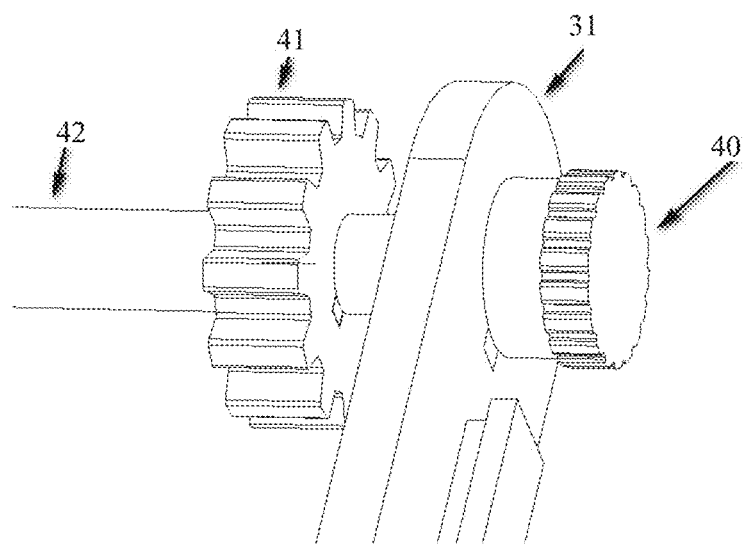
FIG. 21 is a partial schematic structural diagram of a movement mechanism in a mobile terminal according to Embodiment two of the present disclosure.
Figure 22:
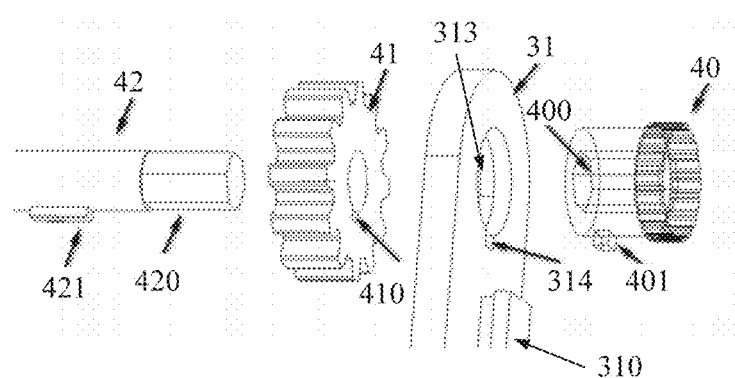
FIG. 22 is an exploded schematic structural diagram of FIG. 21.

Specifically, in this embodiment, as shown in FIGS. 21 and 22, the power source of the movement mechanism includes a manual driving portion 40. The manual driving portion 40 is movably mounted on the sliding support plate 31, so that the driving portion 40 can drive, after its movement, the transmission mechanism to move, and the transmission mechanism in turn drives the support mechanism and the expansion portion 21 to expand and retract and also drives the sliding support plate 31 to slide.

The driving portion 40 can rotate relative to the sliding support plate 31, and the rotating driving portion 40 drives the transmission mechanism to move. In this case, the working principle of the driving portion 40 is similar to a motor. The driving portion 40 can also translate relative to the sliding support plate 31 to drive the transmission mechanism to move. On one hand, the transmission mechanism drives the support mechanism and the expansion portion 21 to expand and retract, and on the other hand drives the sliding support plate 31 to slide. However, a sliding distance of the sliding support plate 31 is not equal to a translation distance of the driving portion 40, so the driving portion 40 will translate relative to the sliding support plate 31.

It should be understood that the driving portion 40 may also be fixedly mounted relative to the sliding support plate 31. In this case, the sliding support plate 31 can be driven to move by the driving portion 40, and then the movement mechanism can be driven by the sliding support plate 31 to move.

Optionally, in order to facilitate the operation of driving the driving portion 40 to move, at least a part of the driving portion 40 is made to protrude from an outer side of the sliding support plate 31 so as to manually drive the driving portion 40.

Optionally, a non-slip structure is provided on the driving portion 40. For example, in this embodiment, the driving portion 40 has a regular concave-convex shape to avoid slipping when the driving portion 40 is rotated.

Specifically, in this embodiment, as shown in FIGS. 21 and 22, a mounting hole 313 is formed in the sliding support plate 31, so that the transmission shaft 42 is connected to the driving portion 40 after passing through the mounting hole 313. Rotation limiting structures 420 and 400, which are fitted with each other, are provided on the transmission shaft 42 and the driving portion 40 to realize the circumferential fixation of the transmission shaft 42 and the driving portion 40, so that the transmission shaft 42 can be driven to rotate after manually rotating the driving portion 40. Rotation limiting structures 421 and 410, which are fitted with each other, are provided on the transmission shaft 42 and the chain wheel 41 to realize the circumferential fixation of the transmission shaft 42 and the chain wheel 41, so that the transmission shaft 42 drives the chain wheel 41 to rotate. A locking protrusion 401 and a locking groove 314 are respectively formed on the driving portion 40 and the sliding support plate 31, so that the locking protrusion 401 and the locking groove 314 cooperate after the expansion or retraction of the flexible screen 2 to prevent the driving portion 40 from rotating, thereby locking the size of the display screen.

Optionally, the driving portion 40 is telescopically mounted on the sliding support plate 31. That is, the driving portion 40 can extend outward so that at least a part of the driving portion 40 protrudes from the sliding support plate 31, and the driving portion 40 can retract inward so that at least a part of the driving portion 40 is located in the sliding support plate 31.

In order to ensure that the driving portion 40 does not fall off after being pulled out, a limiting structure may be provided. For example, a limiting steel sheet or a PC sheet is stuck on the sliding support plate 31.

After the assembly is completed, the rotation limiting structures 420 and 400 and the rotation limiting structures 421 and 410 are always in the fitted state, so that there is no relative rotation among the driving portion 40, the transmission shaft 42 and the chain wheel 41. In the case that the expansion portion 21 of the flexible screen 2 needs to be expanded or retracted, the driving portion 40 is pulled out to disengage the locking protrusion 401 from the locking groove 314, and the user can manually rotate the driving portion 40 to drive the chain wheel 41. After the expansion or retraction of the flexible screen is completed, the driving portion 40 can be pressed back so that the locking protrusion 401 and the locking groove 314 are fitted. Thus, the driving portion 40 can be prevented from rotating, thereby locking the size of the screen.

In the above structure, there may be a plurality of locking protrusions 401 and/or locking grooves 314 to lock the display screen almost at any position, in order to improve the user experience.

It should be understood that a locking groove 314 may be formed on the driving portion 40 and a locking protrusion 401 may be formed on the sliding support plate 31. Alternatively, other structures may be used to lock the driving portion 40. For example, the driving portion 40 is in interference fit with the mounting hole, and the driving portion 40 is locked by the frictional force between the driving portion 40 and the mounting hole 313.

In this embodiment, the movement mechanism is manually driven, the control way is simple, and the structure implementation way is also simpler than driving by a motor. Thus, the overall structure of the mobile terminal is simple and the cost is low.

Embodiment Three

Figure 23:
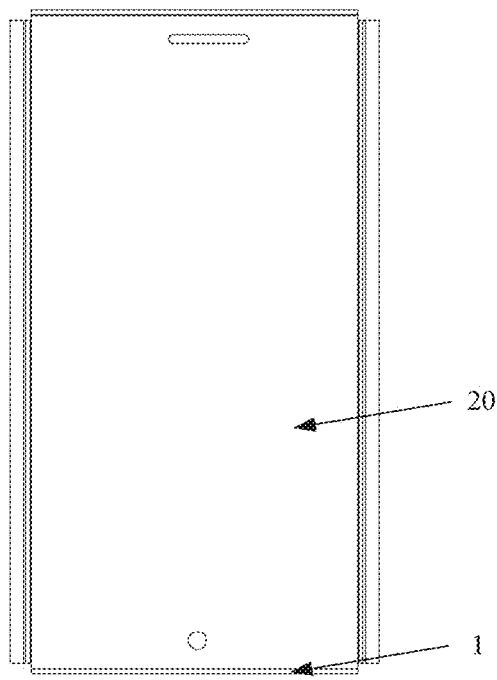
FIG. 23 is a schematic structural diagram of a mobile terminal in the narrow-screen mode according to Embodiment three of the present disclosure.
Figure 24:
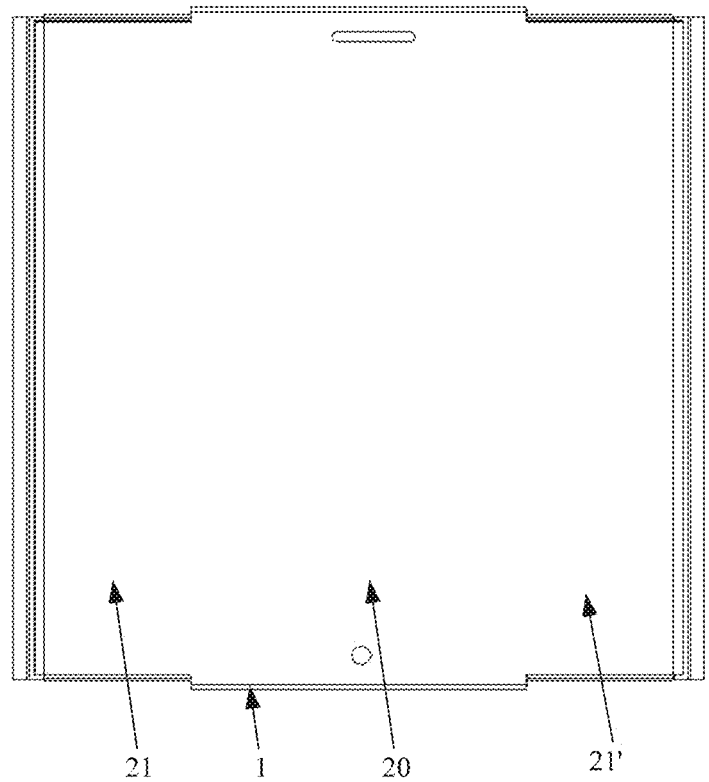
FIG. 24 is a schematic structural diagram of the mobile terminal of FIG. 3 in the wide-screen mode.
Figure 25:
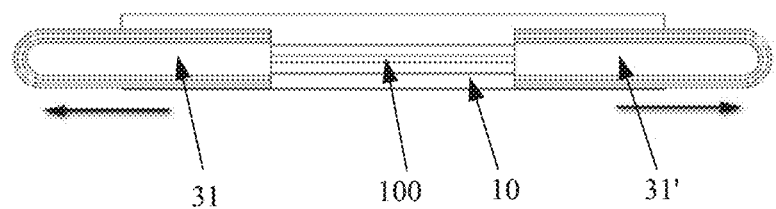
FIG. 25 is a schematic structural diagram showing fitting of the sliding support member and the fixed plate in the mobile terminal in the wide-screen mode of FIG. 24.

As shown in FIGS. 23-25, in this embodiment, a mobile terminal is provided, which differs from the mobile terminal described in Embodiment one or Embodiment two in that, the flexible screen 2 can expand on both sides.

Specifically, in this embodiment, the flexible screen 2 includes two expansion portions 21, 21'. The two expansion portions 21, 21' are located on the left and right sides of the flexible screen 2, and the fixed portion 20 is located in the middle of the flexible screen 2. Correspondingly, there are two movement mechanisms and two support structures, and the two movement mechanisms are respectively configured to drive the two expansion portions 21, 21' to move and the two support structures are respectively configured to support the two expansion portions 21, 21'.

Further, the two sliding support plates 31, 31' of the two support structures are both slidably connected to the inner surface of the fixed plate 10.

As shown in FIG. 25, a slide rail 100 is provided on the inner surface of the fixed plate 10, and the two sliding support plates 31, 31' are in sliding fit with the slide rail 100; and the sum of widths of the two sliding support plates 31, 31' (in the left-right direction) is approximately equal to the width (in the left-right direction) of the fixed plate 10, so that the two sliding support plates 31, 31' can drive the expansion portions 21, 21' to retract into the fixed housing 1. Preferably, the width of each sliding support plate 31, 31' is half the width of the fixed plate 10. Thus, after the expansion portions 21, 21' are expanded to the maximum, the display screen is twice its original size.

It should be understood that two slide rails may also be provided on the inner surface of the fixed plate 10, and each of the two sliding support plates 31, 31' is slidably fitted with one slide rail.

In this embodiment, a scheme of one single slide rail and two-side expansion is implemented. Compared with the schemes of Embodiment one or Embodiment two, a set of support structure and movement mechanism is additionally provided, which makes the structure of the mobile terminal more complicated. However, the flexible screen 2 in this embodiment can expand on both sides. The user can choose to expand the flexible screen 2 to the left side or on the right side, or expand the flexible screen 2 on both sides. The expansion of the flexible screen 2 will be freer and the user experience will be better.

Embodiment Four

Figure 26:
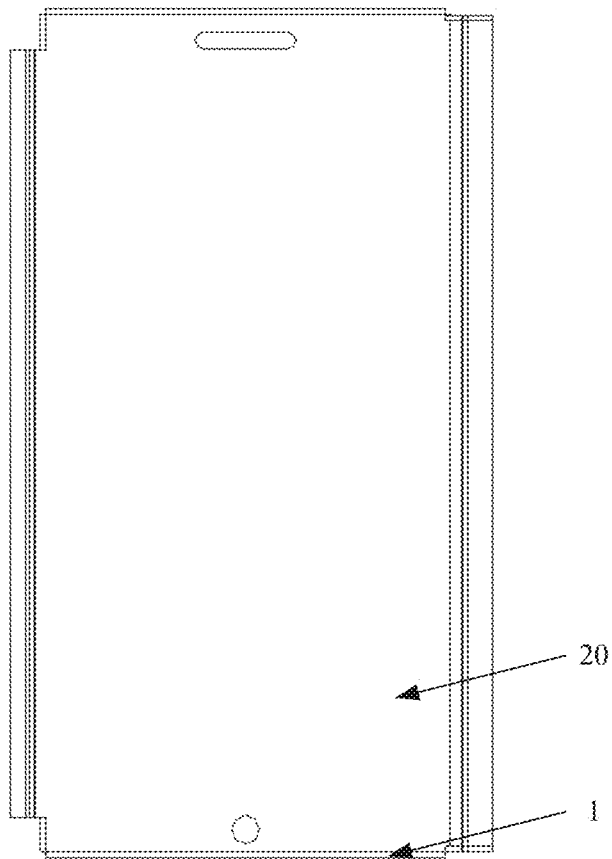
FIG. 26 is a schematic structural diagram of a mobile terminal in the narrow-screen mode according to Embodiment four of the present disclosure.
Figure 27:
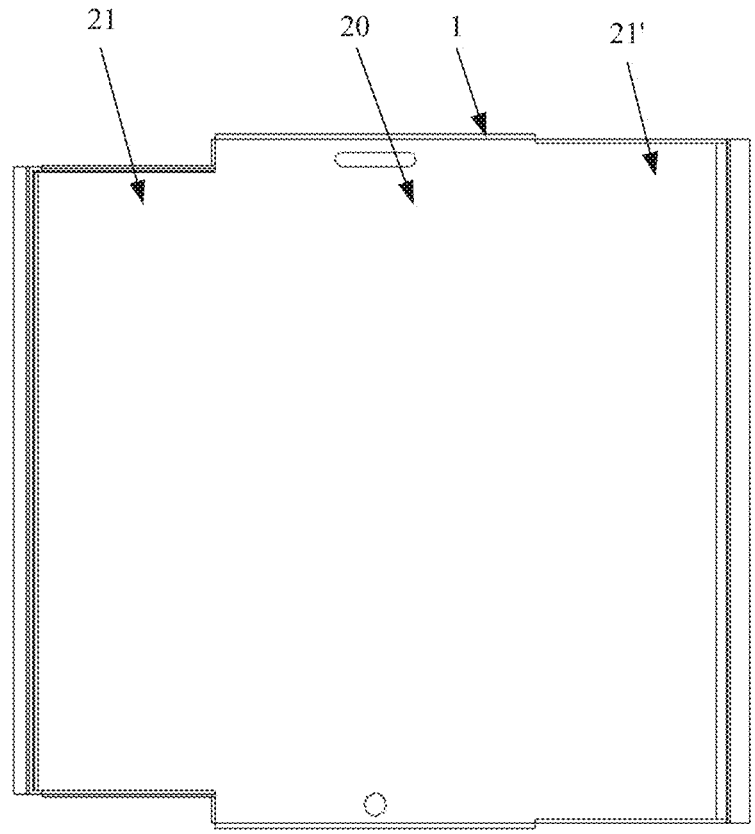
FIG. 27 is a schematic structural diagram of the mobile terminal of FIG. 26 in the wide-screen mode.
Figure 28:
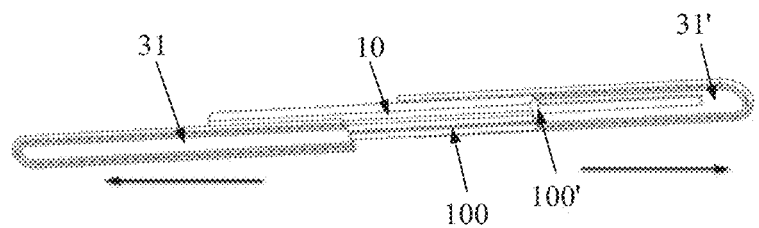
FIG. 28 is a schematic structural diagram showing fitting of the sliding support member and the fixed plate in the mobile terminal in the wide-screen mode of FIG. 27.

As shown in FIGS. 26-28, in this embodiment, a mobile terminal is provided, whose flexible screen 2 can be expanded on both sides. The main difference from the mobile terminal described in Embodiment three is that, in this embodiment, the two sliding support plates 31, 31' of the two support structures are respectively slidably connected to the inner and outer surfaces of the fixed plate 10.

Compared with the scheme of one single slide rail and two-side expansion in Embodiment three, a scheme of double slide rails and two-side expansion is implemented.

Specifically, in this embodiment, slide rails 100, 100' are provided on both the inner and outer surfaces of the fixed plate 10, where the slide rail 100 on the inner surface supports left (or right) expansion of the expansion portion 21 of the flexible screen 2, and the slide rail 100' on the outer surface supports right (or left) expansion of the expansion part 21' of the flexible screen 2.

The difference from the technical scheme of Embodiment three is that, in the scheme of this embodiment, each slide rail 100, 100' may have a length (in the left-right direction) equal to a width of the fixed plate 10, and each sliding support plate 31, 31' has a width (in the left-right direction) equal to the width (in the left-right direction) of the fixed plate 10. Therefore, after the expansion portion 21, 21' on the left or right side is expanded to the maximum, the original size of the display screen (i.e., fixed portion 20) can be obtained. Thus, after the expansion portions 21, 21' on the left and right sides are fully expanded to the left and right, the size of the display screen of the whole terminal can be three times the original size of the display screen.

In this embodiment, due to the provision of the two slide rails 100, 100' on the inner and outer sides, a greater degree of expansion of the display screen is realized, so that the width of the whole terminal is increased as compared with the scheme in Embodiment three. In addition, because it is expected to have three screens (that is, the expansion portion 21 on the left, the fixed portion 20, and the expansion portion 21' on the right), the whole terminal has an increased thickness as compared with the scheme in Embodiment three, since a greater space is needed to accommodate the increased screen.

It should be noted that, although in FIG. 27, the expansion portion 21 expanded on the left and the expansion portion 21' expanded on the right are not in the same height, the expansion portion 21 expanded on the left and the expansion portion 21' expanded on the right may have the same height, as long as the support mechanism on the left side and the support mechanism on the right side are in the same height. In this way, the expansion portions 21 and 21' fixed on the support mechanisms on the left and right sides can be ensured to be in the same height.

Although there are partially-folded three-screen mobile phones at present, it is difficult to realize seamless connection between the three screens, resulting in poor display effect of the display screen. However, in this embodiment and Embodiment three, Seamless connection between the three screens can be realized with better display effect, simple control mode and convenient overall operation, which can better meet the needs of users.

Embodiment Five

This embodiment also provides a mobile terminal having a non-flat display screen.

In this embodiment, a non-flat display screen is proposed based on Embodiment one. In order to realize the expansion of the non-flat display screen, this embodiment proposes a non-flat expansion method which changes the shape of the guide rail on the sliding support plate 31 and/or the slide rail 100 on the fixed plate 10 to change the expansion effect of the display screen.

In this expansion mode, the shape of the guide segments 3120 of the guide rail on the sliding support plate 31 and the slide rail 100 on the fixed plate 10 are no longer a linear shape parallel to the whole terminal, but a bent and smooth curved shape.

When the display screen of the mobile terminal is a curved display screen, at least one of the slide rail 100 on the fixed plate 10 and the guide segments 3120 of the guide rail 312 on the sliding support plate 31 is of a bent and smooth curved shape, so that the sliding support plate 31 cannot slide linearly with respect to the fixed housing 1, and/or the expansion portion 21 supported on the support mechanism is not horizontal. As a result, in the wide-screen mode, the display screen formed by the fixed portion 20 and at least a part of the expansion portion 21 is a curved display screen.

Hereinafter, this embodiment will be described in detail with reference to the drawings.

In the non-flat expansion mode, the structure of main components that are used to realize the non-flat expansion is shown in FIGS. 29 and 30. The fixed plate 10 may be fixed to the fixed housing 1 by means of glue, and the sliding support plate 31 and the fixed plate 10 are slidably connected. The slide rail 100 on the fixed plate 10 and the guide segments 3120 on the sliding support plate 31 are all of smooth curved shapes. Since the structures of the movement mechanism, support mechanism, housing and other components are basically the same as those of Embodiment one, they will not be shown for the purpose of simplification.

As shown in FIGS. 29 and 30, the fixed portion 20 of the flexible screen is always in a horizontally tiled state in both the wide-screen mode and the narrow-screen mode. Of course, the state of the fixed portion 20 is not limited to the horizontally tiled state, and it may be bent if required. This needs to be achieved by changing the shape of the whole terminal.

The state of the expansion portion 21 of the flexible screen 2 in the wide-screen mode is shown in FIG. 30. As shown, the display screen formed by the expansion portion 21 and the fixed portion 20 is a curved screen.

In order to ensure smooth connection between the expansion portion 21 and the fixed portion 20 of the flexible screen in the wide-screen mode without stepping, an end of the expansion portion 21 connected with the fixed portion 20 should be tangent to the fixed portion 20.

Since, as the expansion portion 21 of the flexible screen 2 is gradually expanded, the distance that the sliding support plate 31 slides on the fixed plate 10 changes and the support mechanism and the sliding support plate 31 move relative to each other, to ensure that an end of the expansion portion 21 connected with the fixed portion 20 is always tangent to the fixed portion 20, the slide rail 100 needs to be fitted with the guide segments 3120. In this embodiment, the slide rail 100 and the guide segments 3120 are shaped in arcs, and the circles containing the arcs are concentric. Furthermore, the slide rail 100 and the guide segments 3120 have the same bending direction and the same radius. Therefore, the end of the expansion portion 21 connected with the fixed portion 20 is always tangent to the fixed portion 20, so that the display screen transitions smoothly at the connection position.

In the non-flat expansion mode, the degree of bending of the expanded display screen is determined by the degree of bending of the slide rail 100 and the guide segments 3120. The lower the degree of bending of the slide rail 100 and the guide segments 3120, the lower the degree of bending of the expanded display screen, the smaller the required accommodation space, and the less the thickness of the whole terminal. On the contrary, the higher the degree of bending of the slide rail 100 and the guide segments 3120, the higher the degree of bending of the expanded display screen, the larger the required accommodation space, and the greater the thickness of the whole terminal.

In the non-flat expansion way, the curved expansion of the display screen is realized by changing the shape of the slide rail 100 and the guide segments 3120. The expansion effect of the display screen is changed without increasing the process and assembly complexity. The expansion effect is diversified, and the style of the display screen of the mobile terminal is enriched.

Embodiment Six

This embodiment provides a control method for controlling the expansion and retraction of a flexible screen of a mobile terminal.

As shown in FIG. 31, the control method includes the following steps:

At S110, acquiring an instruction to expand a flexible screen or retract the flexible screen; and At S120, controlling the action of a movement mechanism according to the instruction to make the expansion portion of the flexible screen perform expansion or retraction.

Optionally, when the mobile terminal further includes a detection device configured to detect the degree of expansion of the flexible screen, the control method further includes the following steps:

controlling the movement mechanism to stop acting in response to the acquired instruction being an instruction to expand the flexible screen, and the detection device detecting that the expansion percentage of the flexible screen reaches the maximum; and controlling the movement mechanism to stop acting in response to the acquired instruction being an instruction to retract the flexible screen, and the detection device detecting that the expansion percentage of the flexible screen reaches the minimum.

Specifically, when the detection device detects that the degree of expansion of the expansion portion reaches the maximum, that is, the expansion percentage of the flexible screen reaches 100%, the expansion portion has been fully expanded and the flexible screen cannot be further expanded. In this case, if an instruction to expand the flexible screen is acquired, the movement mechanism will not act. When the detection device detects that the expansion of the expansion portion reaches the minimum, that is, the expansion percentage of the flexible screen reaches 0%, the expansion portion has been completely retracted and the flexible screen cannot be further retracted. In this case, if an instruction to retract the flexible screen is acquired, the movement mechanism will not act.

Optionally, the instruction includes a degree of expansion specified for the flexible screen (for example, it may be expressed by expansion percentage). The control method further includes:

controlling the movement mechanism to act to adjust the degree of expansion of the flexible screen to the specified degree of expansion in response to the degree of expansion of the flexible screen detected by the detection device being inconsistent with the specified degree of expansion.

Specifically, when the acquired instruction is to expand the flexible screen and expand the flexible screen to, for example, 30%, if the detection device detects that the actual expansion percentage of the flexible screen is inconsistent with the expansion percentage 30% specified by the instruction, the movement mechanism is controlled to act to adjust the actual expansion percentage of the flexible screen, so that the actual expansion percentage is consistent with the expansion percentage specified by the instruction.

The control method of this embodiment will be described in detail below with reference to FIG. 31.

When expansion and retraction of the flexible screen according to the embodiment of the present application is driven by a motor, one-key control of expansion and retraction can be realized by software.

To realize one-key control of expansion and retraction of the flexible screen, first, it is needed to mount a distance sensor on the sliding support plate of the flexible screen, and provide an auxiliary detection device on the main board. By measuring the distance between the detection sensor and the auxiliary detection device, the distance of the sliding support plate protruding from the fixed housing is obtained, and then the size of expansion of the flexible screen is obtained.

It is just needed to provide two keys on the software interface: one is to expand the flexible screen and the other is to retract the flexible screen, and also provide a display window for displaying the expansion percentage of the flexible screen. To obtain the expansion percentage of the flexible screen, two values need to be determined. One is the distance Lmax between the distance sensor and the auxiliary detection device when the flexible screen is expanded to the maximum (in this case, the expansion of the flexible screen reaches 100%), and the other is the distance Lmin between the distance sensor and the auxiliary detection device (in this case, the expansion of the flexible screen reaches 0%) when the flexible screen is not expanded. At any specific position, the expansion percentage of the flexible screen can be obtained by simple interpolation of the distance L between the distance sensor and the auxiliary detection device with the maximum distance Lmax and minimum distance Lmin between the two.

Figure 32:
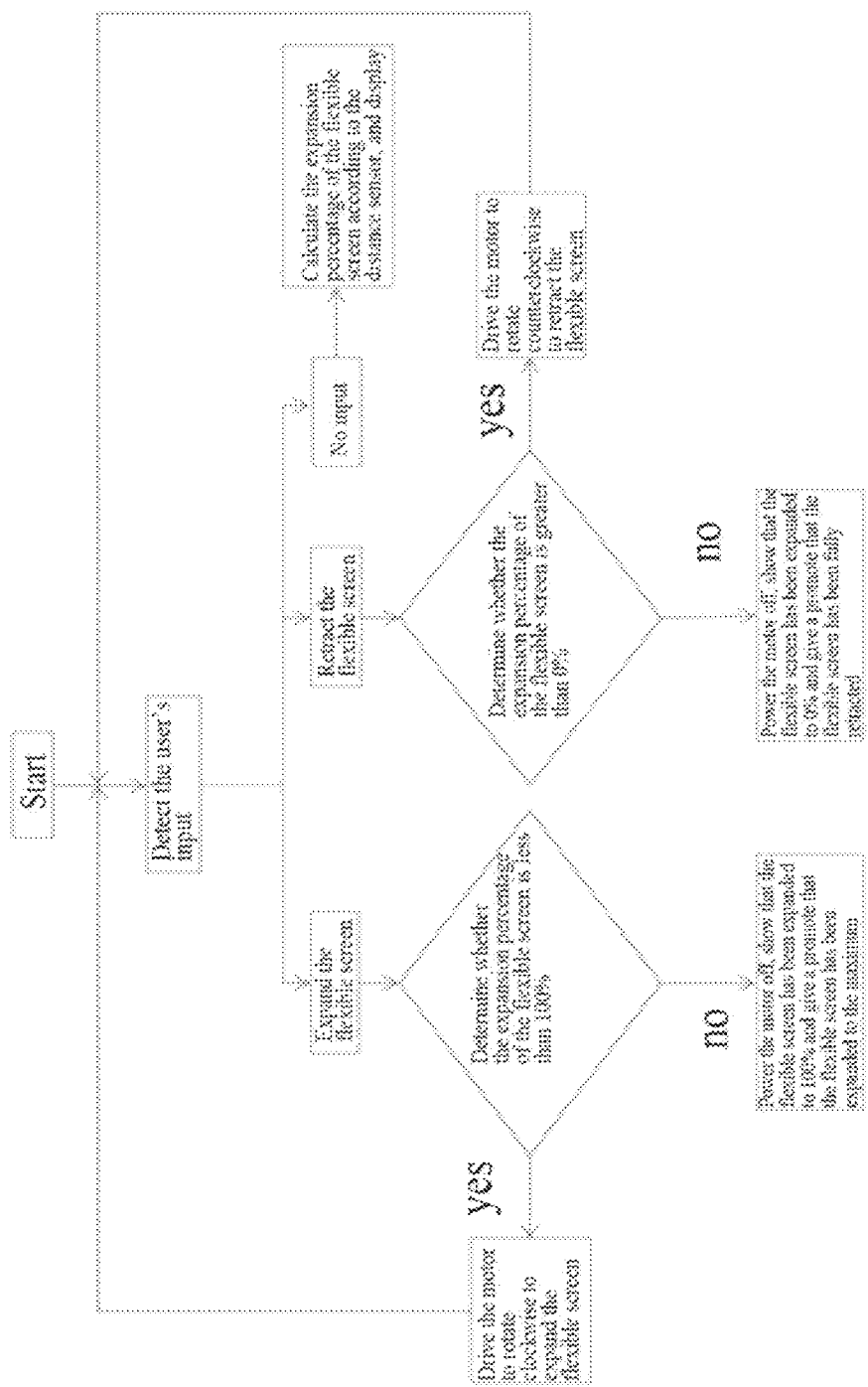
FIG. 32 is a flowchart of an exemplary flexible screen control method according to Embodiment six of the present disclosure.

As shown in FIG. 32, an exemplary method for controlling the expansion or retraction of a flexible screen in this embodiment will be described below.

First, the user's input is detected;

if the user inputs an instruction to expand the screen, first, it is determined whether the flexible screen is expanded to the maximum, that is, whether the expansion percentage of the flexible screen is less than 100%; in response to the expansion percentage being less than 100%, the motor is driven to rotate clockwise to expand the flexible screen; and if the percentage is not less than 100%, the motor will be powered off, it is shown that the flexible screen has been expanded to 100% and a promote will be given that the flexible screen has been expanded to the maximum;

if the user inputs an instruction to retract the screen, first, it is determined whether the flexible screen is expanded to the minimum, that is, whether the expansion percentage of the flexible screen is greater than 0%; in response to the expansion percentage being greater than 0%, the motor is driven to rotate counterclockwise to retract the flexible screen; and if the percentage is not greater than 0%, the motor will be powered off, it is shown that the flexible screen has been expanded to 0% and a promote will be given that the flexible screen has been fully retracted; and In response to no user's input being detected, the expansion percentage of the flexible screen is displayed.

For the manual driving method shown in Embodiment two as the driving power of the chain wheel, the distance sensor and the corresponding auxiliary detection device are also needed to assist in judging the degree of expansion or retraction of the flexible screen, but the control method and software flow are relatively simpler. Furthermore, the software interface can only be responsible for prompting the user of the degree of expansion of the flexible screen. The function is relatively simple, and the expansion action of the flexible screen cannot be controlled by software. When the user obtains the desired size of the flexible screen, he needs to manually stop the expansion or retraction of the flexible screen, so that the size of the flexible screen is locked in the required display state.

This embodiment further provides a control system which can implement the method for controlling the flexible screen of this embodiment.

Figure 33:
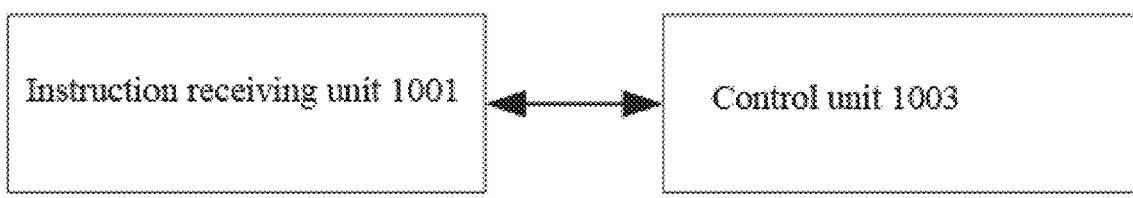
FIG. 33 is a block diagram of a flexible screen control system according to Embodiment six of the present disclosure.

As shown in FIG. 33, the control system includes:

an instruction input unit 1001 configured to receive an instruction to expand the flexible screen or retract the flexible screen; and a control unit 1003 configured to control the action of the movement mechanism according to the instruction.

Optionally, the instruction input unit includes two keys configured to control the expansion of the flexible screen and the retraction of the flexible screen, respectively.

Optionally, the control system further includes a display processing unit configured to receive a result of detection on the degree of expansion of the flexible screen by a detection device and display the result on the display screen of the mobile terminal; and the detection device is arranged on the mobile terminal to detect the degree of expansion of the flexible screen.

Optionally, the control unit controlling the action of the movement mechanism according to the instruction includes:

the control unit controls the movement mechanism to stop acting in response to the received instruction being an instruction to expand the flexible screen and the result of detection by the detection device being that the degree of expansion of the flexible screen reaches the maximum; and the control unit controls the movement mechanism to stop acting in response to the instruction being an instruction to retract the flexible screen and the result of detection by the detection device being that the degree of expansion of the flexible screen reaches the minimum.

Optionally, the instruction contains the degree of expansion specified for the flexible screen; and the control unit controlling the action of the movement mechanism according to the instruction includes: in response to the degree of expansion of the flexible screen detected by the detection device being inconsistent with the specified degree of expansion, the movement mechanism is controlled to act to adjust the degree of expansion of the flexible screen to the specified degree of expansion.

In summary, the present application makes full use of the characteristics of the flexible screen to realize the one-key expansion and retraction of the flexible screen. This present application can be applied to any electronic devices that may use a flexible screen and may have display screen expansion needs. Therefore, the mobile terminal of the present application is not limited to mobile phones, and may be tablets, laptops, etc.

In the description of the present application, the term "a plurality of" refers to two or more.

In the description of the present application, directions indicated by terms "upper", "lower", "left", "right", "front" and "rear" are all based on the assumption that the mobile terminal is horizontally placed and the end where the display screen is located is regarded as the upper end.

It should be noted that, although in the above-mentioned embodiments of the present application, the flexible screen is expanded to the left and/or right, the flexible screen may be expanded to the front and/or back.

Those of ordinary skill in the art will appreciate that all or some of the steps in the methods, and systems disclosed above may be implemented as software, firmware, hardware, and suitable combinations thereof. In a hardware implementation, the division between functional blocks/elements mentioned in the above description does not necessarily correspond to the division of physical components; for example, one physical component may have multiple functions, or one function or step may be co-executed by several physical components. Some or all of the components may be implemented as software executed by a processor, such as a digital signal processor or microprocessor, or as hardware, or as an integrated circuit, such as an application specific integrated circuit. Such software may be distributed on a computer readable medium, which may include computer storage media (or non-transitory media) and communication media (or transitory media). As is well known to those of ordinary skill in the art, the term computer storage medium includes volatile and nonvolatile, removable and non-removable media implemented in any method or technology for storing information (such as computer readable instructions, data structures, program modules or other data). Computer storage media includes, but is not limited to, RAM, ROM, EEPROM, flash memory or other memory technology, CD-ROM, digital versatile disc (DVD) or other optical disc storage, magnetic cartridge, magnetic tape, magnetic disk storage or other magnetic storage device, or may any other medium used to store desired information and that can be accessed by a computer. Moreover, it is well known to those of ordinary skill in the art that communication media typically includes computer readable instructions, data structures, program modules, or other data in a modulated data signal, such as a carrier wave or other transport mechanism, and may include any information delivery media.

INDUSTRIAL APPLICABILITY

The present disclosure is applicable to the technical field of mobile terminals to realize continuous expansion and retraction of flexible screens, and to meet people's different requirements on the size of the display screen in different situations.

The invention claimed is:

1. A mobile terminal, comprising a housing and a flexible screen,
wherein:
the flexible screen comprises a fixed portion fixed on the housing and an expansion portion movable relative to the housing;
the mobile terminal further comprises a support structure and a movement mechanism, the movement mechanism is configured to drive the expansion portion to move so that at least a part of the expansion portion is driven to move outside the housing; and
the movement mechanism is capable of driving the expansion portion to move in an opposite direction so that the expansion portion outside the housing is driven to retract into the housing; and
the support structure is configured to support the expansion portion,
wherein the support structure comprises a support mechanism configured to support the expansion portion, and the movement mechanism is configured to indirectly drive the expansion portion to move by driving the support mechanism to move;

wherein the support structure further comprises a sliding support member, the housing comprises a fixed housing, the sliding support member is slidably connected to the fixed housing through a sliding pair, the sliding support member is connected with the movement mechanism and capable of moving under the drive of the movement mechanism, and the support mechanism is supported on the sliding support member;

wherein the support structure further comprises a slip-off preventing structure that is configured to prevent the sliding support member from slipping off;

wherein the slip-off preventing structure comprises a first slip-off preventing protrusion fixed on the fixed housing and a second slip-off preventing protrusion fixed on the sliding support member, and during a sliding process of the sliding support member, the first slip-off preventing protrusion is capable of interfering with the movement of the second slip-off preventing protrusion.

2. The mobile terminal of claim 1, wherein the support mechanism comprises a plurality of support slats, and two adjacent support slats of the plurality of support slats are movably connected; or, the support mechanism comprises a support belt or a support plate made of flexible material; or, the support mechanism comprises a flexible support belt and a plurality of support slats, and the plurality of support slats are fixed on the flexible support belt.

3. The mobile terminal of claim 1, wherein a fixed plate is fixedly connected to the fixed housing, the sliding pair comprises a sliding portion and a slide rail, the sliding portion is arranged on one of the fixed plate and the sliding support member, and the slide rail is arranged on the other of the fixed plate and the sliding support member.

4. The mobile terminal of claim 1, wherein the support structure is provided with a guide structure capable of guiding the movement of the support mechanism.

5. The mobile terminal of claim 1, wherein a guide rail is provided on the sliding support member, and the guide rail comprises a plurality of guide segments arranged along a sliding direction of the sliding support member and a connecting segment that connects the plurality of guide segments in sequence; and a guide portion is arranged on the support mechanism, and the guide portion is fitted with the guide rail.

6. The mobile terminal of claim 5, wherein a display screen formed by the fixed portion and at least a part of the expansion portion of the flexible screen is a flat display screen, the sliding pair comprises a slide rail, and the slide rail and the guide segments of the guide rail are all linear; or, a display screen formed by the fixed portion and at least a part of the expansion portion of the flexible screen is a curved display screen, the sliding pair comprises a slide rail, and at least one of the guide segment of the guide rail and the slide rail is of a bent and smooth curved shape;

or, a display screen formed by the fixed portion and at least a part of the expansion portion of the flexible screen is a curved display screen, the sliding pair comprises a slide rail, the slide rail and the guide segment of the guide rail are all arc-shaped, and centers of the arcs coincide.

7. The mobile terminal of claim 1, wherein the housing comprises a protective housing which comprises a bottom plate, a first side plate, a second side plate and a third side plate, the bottom plate is fixed to the sliding support member, the first side plate and the second side plate are respectively fixed to two opposite sides of the bottom plate, and the first side plate and the second side plate are arranged along the sliding direction of the sliding support member, the third side plate is fixed to an end of the bottom plate away from the sliding support member, and the third side plate is a curved plate with a radian.

8. The mobile terminal of claim 1, wherein the movement mechanism comprises a power source and a transmission mechanism, the power source is mounted on the housing or the support structure, the power source is connected with the transmission mechanism and is configured to drive the transmission mechanism to move, and the transmission mechanism is connected with the support structure and is configured to drive the support structure to move.

9. The mobile terminal of claim 8, wherein a limiting structure is fixed on the housing, and the limiting structure is configured to limit and fix an end of the transmission mechanism close to the fixed portion.

10. The mobile terminal of claim 9, wherein the limiting structure is a unidirectional limiting structure configured to limit and fix an end of the transmission mechanism close to the fixed portion in response to the expansion portion moving outside the housing; or, the limiting structure is a bidirectional limiting structure configured to limit and fix an end of the transmission mechanism close to the fixed portion in response to the expansion portion moving outside the housing and retracting into the housing.

11. The mobile terminal of claim 10, wherein the limiting structure is a unidirectional limiting structure comprising a limiting protrusion fixed on the housing and an end of the transmission mechanism close to the fixed portion abuts against the limiting protrusion; or, the limiting structure is a bidirectional limiting structure, and the bidirectional limiting structure comprises a fixing member that fixedly connects an end of the transmission mechanism close to the fixing portion with the housing.

12. The mobile terminal of claim 1, wherein the movement mechanism comprises a motor and a transmission mechanism, the motor is mounted on the sliding support member and located on an inner side of the sliding support member, and the motor is connected to the transmission mechanism and is configured to drive the transmission mechanism to move, and the transmission mechanism is connected to the support mechanism and is configured to drive the support structure to move.

13. The mobile terminal of claim 1, wherein the movement mechanism comprises a driving portion and a transmission mechanism, the driving portion is mounted on the sliding support member and at least a part of the driving portion protrudes from the outer side of the sliding support member, the motor is connected to the transmission mechanism and is configured to drive the transmission mechanism to move, and the transmission mechanism is connected to the support mechanism and is configured to drive the support structure to move.

14. The mobile terminal of claim 13, wherein the driving portion is telescopically mounted on the sliding support member, and the driving portion is capable of extending outward so that at least a part of the driving portion protrudes from the outer side of the sliding support member, and the driving portion is capable of retracting inward so that at least a part of the driving portion is located in the sliding support member.

15. The mobile terminal of claim 13, wherein one of the driving portion and the sliding support member is provided with at least one locking protrusion, and the other is provided with at least one locking groove, the locking protrusion and the locking groove cooperate to lock and fix the driving portion, or the locking protrusion and the locking groove are separated so that the driving portion is capable of acting.

16. The mobile terminal of claim 1, wherein the movement mechanism comprises a power source and a transmission mechanism, the power source is mounted on the housing or the support structure, the power source is connected to the transmission mechanism and is configured to drive the transmission mechanism to move, and the transmission mechanism is a chain transmission mechanism, a belt transmission mechanism, or a gear toothed belt transmission mechanism; and the support structure comprises a support mechanism that is fixed on the chain of the chain transmission mechanism or on the belt of the belt transmission mechanism or on the toothed belt of the gear toothed belt transmission mechanism, and the support mechanism is fixed to the expansion portion and configured to support the expansion portion.

17. The mobile terminal of claim 1, wherein the expansion portion is located at both ends of the flexible screen, the fixed portion is located in a middle of the flexible screen, the number of each of the movement mechanism and the support structure is two, and the two movement mechanisms are respectively configured to drive the expansion portions at both ends to move, and the two support structures are respectively configured to support the expansion portions at both ends; or, the expansion portion is located at one end of the flexible screen, the fixed portion is located at the other end of the flexible screen, and the number of each of the movement mechanism and the support structure is one.

18. The mobile terminal of claim 1, wherein the mobile terminal further comprises a detection device configured to detect the degree of expansion of the flexible screen.

19. The mobile terminal of claim 1, wherein a distance sensor is mounted on the sliding support member, an auxiliary detection device is arranged on the main board of the mobile terminal, and the auxiliary detection device cooperates with the distance sensor to detect a sliding distance of the sliding support member.

20. A control system configured to control expansion and retraction of a flexible screen of a mobile terminal, the mobile terminal comprising a housing and a flexible screen,
wherein:
the flexible screen comprises a fixed portion fixed on the housing and an expansion portion movable relative to the housing;
the mobile terminal further comprises a support structure and a movement mechanism, the movement mechanism is configured to drive the expansion portion to move so that at least a part of the expansion portion is driven to move outside the housing; and
the movement mechanism is capable of driving the expansion portion to move in an opposite direction so that the expansion portion outside the housing is driven to retract into the housing; and
the support structure is configured to support the expansion portion,
wherein the support structure comprises a support mechanism configured to support the expansion portion, and the movement mechanism is configured to indirectly drive the expansion portion to move by driving the support mechanism to move;
wherein the support structure further comprises a sliding support member, the housing comprises a fixed housing, the sliding support member is slidably connected to the fixed housing through a sliding pair, the sliding support member is connected with the movement mechanism and capable of moving under the drive of the movement mechanism, and the support mechanism is supported on the sliding support member;
wherein the support structure further comprises a slip-off preventing structure that is configured to prevent the sliding support member from slipping off;
wherein the slip-off preventing structure comprises a first slip-off preventing protrusion fixed on the fixed housing and a second slip-off preventing protrusion fixed on the sliding support member, and
during a sliding process of the sliding support member, the first slip-off preventing protrusion is capable of interfering with the movement of the second slip-off preventing protrusion;
the control system comprising:
an instruction input unit configured to receive an instruction to expand the flexible screen or retract the flexible screen; and
a control unit configured to control the action of the movement mechanism according to the instruction.

21. A control method for controlling expansion and retraction of a flexible screen of a mobile terminal, the mobile terminal comprising a housing and a flexible screen,
wherein:
the flexible screen comprises a fixed portion fixed on the housing and an expansion portion movable relative to the housing;
the mobile terminal further comprises a support structure and a movement mechanism, the movement mechanism is configured to drive the expansion portion to move so that at least a part of the expansion portion is driven to move outside the housing; and
the movement mechanism is capable of driving the expansion portion to move in an opposite direction so that the expansion portion outside the housing is driven to retract into the housing; and
the support structure is configured to support the expansion portion,
wherein the support structure comprises a support mechanism configured to support the expansion portion, and the movement mechanism is configured to indirectly drive the expansion portion to move by driving the support mechanism to move;
wherein the support structure further comprises a sliding support member, the housing comprises a fixed housing, the sliding support member is slidably connected to the fixed housing through a sliding pair, the sliding support member is connected with the movement mechanism and capable of moving under the drive of the movement mechanism, and the support mechanism is supported on the sliding support member;
wherein the support structure further comprises a slip-off preventing structure that is configured to prevent the sliding support member from slipping off;
wherein the slip-off preventing structure comprises a first slip-off preventing protrusion fixed on the fixed housing and a second slip-off preventing protrusion fixed on the sliding support member, and during a sliding process of the sliding support member, the first slip-off preventing protrusion is capable of interfering with the movement of the second slip-off preventing protrusion;

the control method comprising:

acquiring an instruction to expand the flexible screen or retract the flexible screen; and controlling, according to the instruction, the movement mechanism to act to make the expansion portion of the flexible screen perform expansion or retraction movement.

\* \* \* \* \*